United States Patent [19]
French

[11] Patent Number: 6,051,942
[45] Date of Patent: *Apr. 18, 2000

[54] METHOD AND APPARATUS FOR CONTROLLING A SWITCHED RELUCTANCE MACHINE

[75] Inventor: Alan P. French, Florissant, Mo.

[73] Assignee: Emerson Electric Motor Co., St. Louis, Mo.

[*] Notice: This patent issued on a continued prosecution application filed under 37 CFR 1.53(d), and is subject to the twenty year patent term provisions of 35 U.S.C. 154(a)(2).

[21] Appl. No.: 08/635,240

[22] Filed: Apr. 12, 1996

[51] Int. Cl.$^7$ .................................................. H02K 23/00
[52] U.S. Cl. ............................................ 318/254; 318/701
[58] Field of Search .................................. 312/701–724, 312/254

[56] References Cited

U.S. PATENT DOCUMENTS

| | | | |
|---|---|---|---|
| Re. 34,609 | 5/1994 | Mueller | 318/254 |
| 4,249,116 | 2/1981 | Hieda | 318/254 |
| 4,253,053 | 2/1981 | Ray et al. | 318/701 |
| 4,427,910 | 1/1984 | Richter et al. | 310/214 |
| 4,447,771 | 5/1984 | Whited | 318/661 |
| 4,488,101 | 12/1984 | Studtmann | 318/800 |
| 4,661,756 | 4/1987 | Murphy et al. | 318/701 |
| 4,670,696 | 6/1987 | Bryne et al. | 318/701 |
| 4,712,050 | 12/1987 | Nagasawa et al. | 318/254 |
| 4,761,580 | 8/1988 | Hein et al. | 310/214 |
| 4,859,921 | 8/1989 | Archer | 318/599 |
| 4,868,477 | 9/1989 | Anderson et al. | 318/696 |
| 4,933,621 | 6/1990 | MacMinn et al. | 318/696 |
| 4,943,760 | 7/1990 | Byrne et al. | 318/701 |
| 4,961,038 | 10/1990 | MacMinn | 318/696 |
| 5,072,166 | 12/1991 | Ehsani | 318/696 |
| 5,075,610 | 12/1991 | Harris | 318/701 |
| 5,119,000 | 6/1992 | Schultz | 318/254 |
| 5,124,607 | 6/1992 | Rieber et al. | 310/214 |
| 5,144,209 | 9/1992 | Ingji et al. | 318/254 |
| 5,196,775 | 3/1993 | Harris et al. | 318/638 |
| 5,239,217 | 8/1993 | Horst | 310/51 |
| 5,343,105 | 8/1994 | Sakabe et al. | 310/179 |
| 5,446,359 | 8/1995 | Horst | 318/701 |
| 5,461,295 | 10/1995 | Horst | 318/701 |
| 5,589,752 | 12/1996 | Iwasaki et al. | 318/254 |

FOREIGN PATENT DOCUMENTS

| | | | |
|---|---|---|---|
| 4 036 565 A1 | 5/1992 | Germany | H02P 8/00 |
| 2 167 253 | 5/1986 | United Kingdom | H02P 6/00 |
| 2 167 910 | 6/1986 | United Kingdom | H02K 1/06 |
| WO 93/05564 | 3/1993 | WIPO | H02P 6/02 |
| WO 94/28618 | 12/1994 | WIPO | H02P 6/02 |

OTHER PUBLICATIONS

F. Blaabjerg et al., "Investigation and Reduction of Acoustical Noise from Switched Reluctance Drives in Current and Voltage Control," Sep. 5–7 1994, Proc. ICEM '94, pp. 589–594.

(List continued on next page.)

*Primary Examiner*—David Martin
*Attorney, Agent, or Firm*—Arnold, White & Durkee

[57] ABSTRACT

A method for controlling the average voltage applied to a phase winding of a reluctance machine during periods of current increase, stable current control, and current decrease to improve machine efficiency and thereby reduce acoustical noise produced by the machine and unwanted vibration. According to one aspect, a method is provided whereby a maximum duty cycle is selected and voltage is applied to the phase winding during the period of current increase according to the maximum duty cycle until the current reaches a desired peak current value and thereafter the voltage applied to the phase winding is equal to the lesser of the voltage required to keep the phase current at the predetermined peak current value or the voltage corresponding to the maximum duty cycle.

19 Claims, 17 Drawing Sheets

OTHER PUBLICATIONS

C.Y. Wu and C. Pollock, "Analysis and Reduction of Vibrant and Acoustic Noise in the Switched Reluctance Drive," 1993, Proceedings of the IAS '93, pp. 106–113.

S. Chan et al., "Performance Enhancement of Single–Phase Switched–Reluctance Motor by DC Link Voltage Boosting," Sep. 1993, IEEE Proceedings–B, vol. 140, pp. 316–322.

Stephenson and Blake, "The Characteristics, Design and Applications of Switched Reluctance Motors and Drives," PCIM Conference & Exhibition, Jun. 21–24, 1993, Nuremberg, Germany.

D. E. Cameron et al., "The Origin and Reduction of Acoustic Noise in Doubly Salient Variable–Reluctance Motors," Nov./Dec. 1992, IEEE Transactions on Industry Applications, vol. 28 No. 6, pp. 1250–1255.

Shi–Ping Hsu et al., "Modeling and Analysis of Switching DC–to–DC Converters in Constant–Frequency Current–Programmed Mode," 1979, IEEE Power Electronics Specialists Conference, pp. 284–301.

Frede Blaabjerg and John K. Pedersen, "Digital Implemented Random Modulation Stratagies for AC and Switched Reluctance Drives," *Proceedings of the IECON'93*, pp. 676–682, International Conference on Industrial Electronics, control and Instrumentation, Maui, Hawaii, Nov. 15–19, 1993.

Richard S. Wallace and David G. Taylor, "A Balanced Commutator for Switched Reluctance Motors to Reduce Torque Ripple," *IEEE Transactions on Power Electronics*, vol. 7, No. 4, pp. 617–626, Oct. 1992.

Richard S. Wallace and David G. Taylor, "Low–Torque–Ripple Switched Reluctance Motors for Direct–Drive Robotics," *IEEE Transactions on Robotics and Automation*, vol. 7, No. 6, pp. 733–742, Dec. 1991.

Richard S. Wallace, Jr., "Design and Control of Switched Reluctance Motors to Reduce Torque Ripple," Georgia Institute of Technology, Nov. 1990.

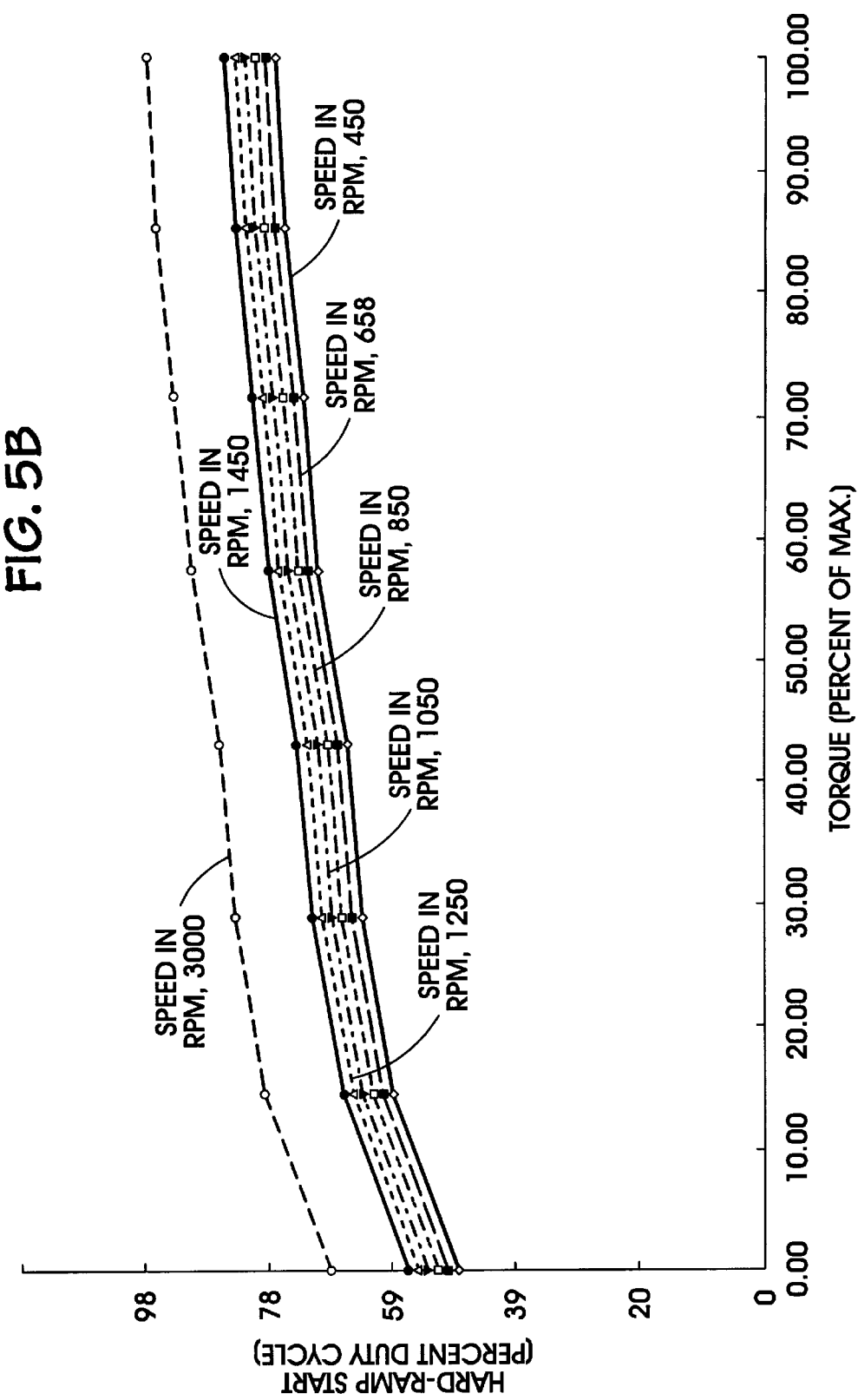

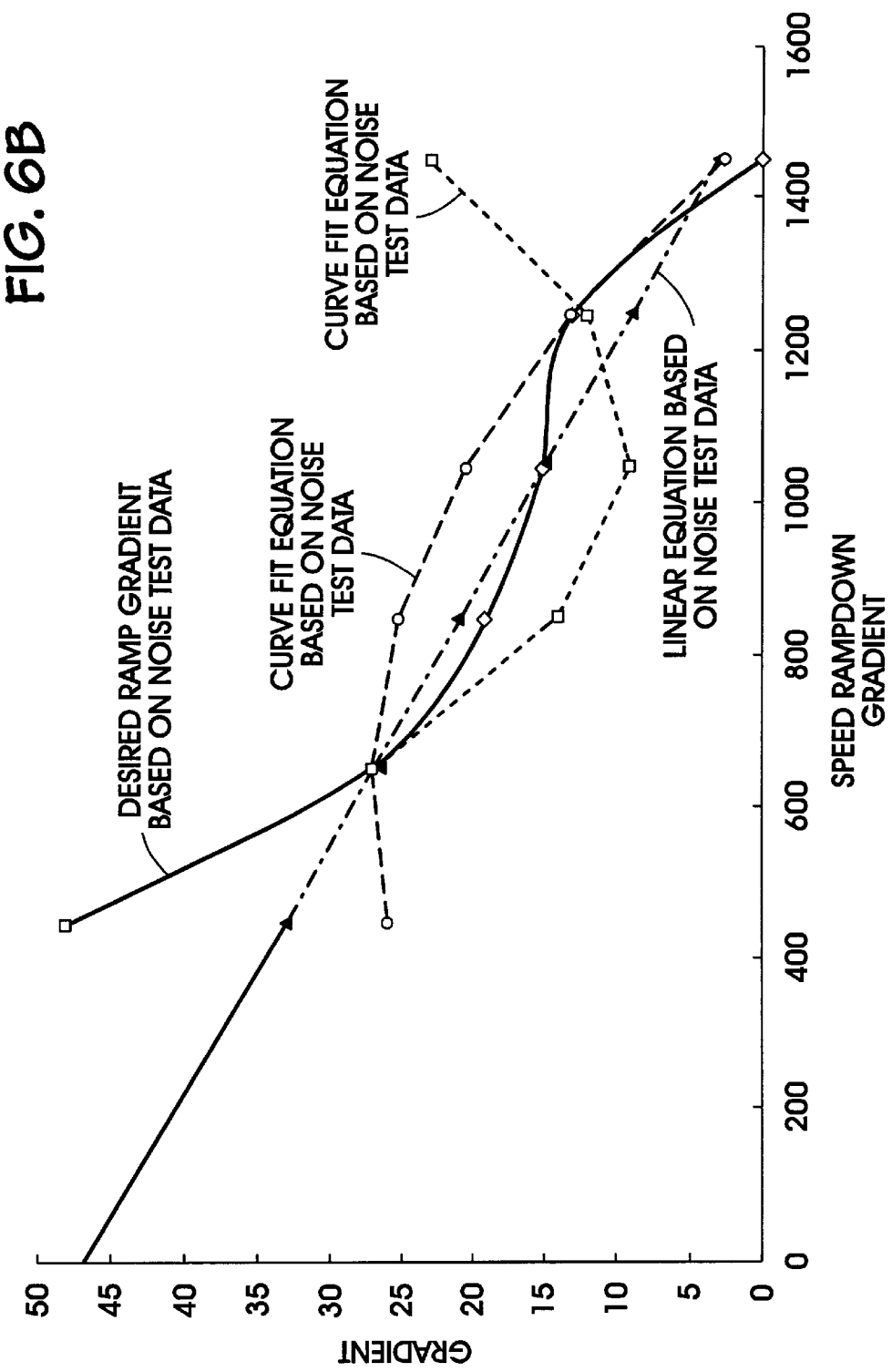

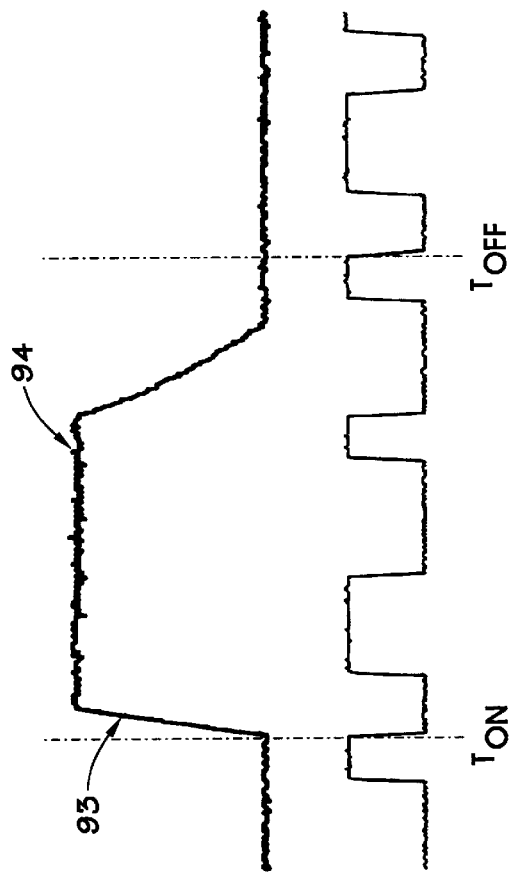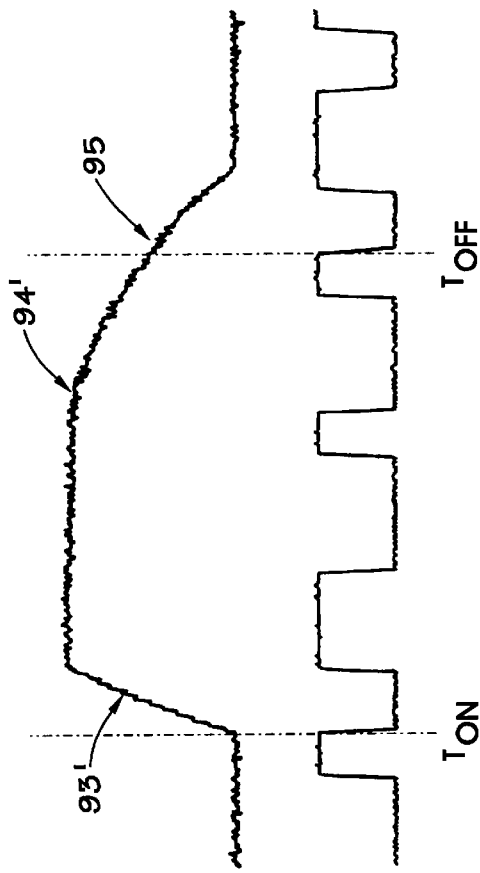

METHOD AND APPARATUS FOR CONTROLLING A SWITCHED RELUCTANCE MACHINE

FIELD OF THE INVENTION

The present invention relates to machine systems and more particularly to a method and apparatus for controlling the voltage and currents in the phase windings of a machine, such as a switched reluctance machine, to improve machine performance by, for example, reducing unwanted noise and vibration.

BACKGROUND OF THE INVENTION

In general, a reluctance machine is an electric machine in which torque is produced by the tendency of its movable part to move into a position where the reluctance of an excited winding is minimized (i.e., the inductance is maximized).

In one type of reluctance machine the energization of the phase windings occurs at a controlled frequency. These machines are generally referred to as synchronous reluctance machines. In a second type of reluctance machine, circuitry is provided for detecting the angular position of the rotor and energizing the phase windings as a function of the rotor's position. This second type of reluctance machine is generally known as a switched reluctance machine. Although the description of the present invention is in the context of a switched reluctance machine, the present invention is applicable to all forms of reluctance machines, including synchronous and switched reluctance motors, synchronous and switched reluctance generators, as well as to other machines that have phase winding arrangements similar to those of switched reluctance machines.

The general theory of design and operation of switched reluctance machines is well known and discussed, for example in *The Characteristics, Design and Applications of Switched Reluctance Motors and Drives*, by Stephenson and Blake and presented at the PCIM '93 Conference and Exhibition at Nuremberg, Germany, Jun. 21–24, 1993.

When a switched reluctance machine is running, including at low speeds or a standstill, the torque (and other machine performance parameters) may be adjusted by monitoring the rotor's position, energizing one or more phase windings when the rotor is at a first angular position, referred to as the "turn-on angle $(T_{ON})$," and then de-energizing the energized windings when the rotor rotates to a second angular position, referred to as the "turn-off angle $(T_{OFF})$." The angular distance between the turn-on angle and the turn-off angle is often referred to as the "conduction angle."

At standstill and at low speeds, the torque of a switched reluctance machine can be controlled by varying the magnitude of the current in the energized phase windings over the period defined by $T_{ON}$ and $T_{OFF}$. Such current control can be achieved by chopping the current using a current reference with phase current feedback. Such current control is referred to as "chopping mode" current control. Alternately, pulse width modulation (PWM) voltage control may be used.

As the angular speed of the motor increases, a point is reached where the amount of current which can be delivered into a phase winding during each phase period is limited by the rapidly increasing inductance and counter emf associated with the winding. At such speeds pulse width modulation or chopping strategies are less desirable and the torque of the machine is commonly controlled by controlling the duration of the voltage pulse applied to the winding during the phase period with respect to the rotor's position. Because a single pulse of voltage is applied during each phase period, this form of control is often referred to as "single-pulse control."

As a switched reluctance motor (or generator) operates, magnetic flux is continuously increasing and decreasing in different parts of the machine. This changing flux will occur in both chopping mode and single-pulse current control. The changing flux results in fluctuating magnetic forces being applied to the ferromagnetic parts of the machine. These forces can produce unwanted noise and vibration. One major mechanism by which these forces can create noise is the ovalizing of the stator caused by magnetic forces normal to the air-gap. Generally, as the magnetic flux increases along a given diameter of the stator, the stator is pulled into an oval shape by the magnetic forces. As the magnetic flux decreases, the stator pulls or springs back to its undistorted shape. This ovalizing and springing back of the stator will produce audible noise and can cause unwanted vibration.

In addition to the distortions of the stator by the ovalizing magnetic forces, acoustic noise and unwanted vibration may also be produced by abrupt changes in the magnetic forces in the motor. These abrupt changes in the gradient of the magnetic flux (i.e., the rate of change of the flux with time) are referred to as "hammer blows" because the effect on the stator is similar to that of a hammer strike. Just as a hammer strike may cause the stator to vibrate at one or more natural frequencies (determined by the mass and elasticity of the stator) the abrupt application or removal of magnetic force can cause the stator to vibrate at one or more of its natural frequencies. In general, the lowest (or fundamental) natural frequency dominates the vibration, although higher harmonics may be emphasized by repeated excitation at the appropriate frequency.

In addition to the stator distortions resulting from the ovalizing and hammer blow phenomena described above, the fluctuating magnetic forces in the motor can distort the stator in other ways, as well as distorting the rotor and other parts of the machine system. For example, distortions of the rotor can cause resonance of the rotor end-shields. These additional distortions are another potential source of unwanted vibration and noise.

Although the problem of unwanted acoustic noise and vibration has been recognized, known control systems for reluctance motors do not adequately solve the problem. For example, the general problem of acoustic noise in switched reluctance motor systems is discussed in C. Y. Wu and C. Pollock, "Analysis and Reduction of Vibration and Acoustic Noise in the Switched Reluctance Drive," *Proceedings of the IAS '93* pp. 106–113 (1993). In general, the method suggested by Wu and Pollock involves control of the current in the phase winding such that the current is controlled in two successive switching steps with the second switching step occurring approximately one-half of a resonant cycle after the first where the resonant cycle is defined by the natural frequency of the machine. This approach is typically implemented by switching off one of the power devices at a first point in time to cause a first stepped reduction in applied voltage, and then later switching off the second power device. Between the time when the first switching device is switched off and the second switching device is switched off, the current is allowed to freewheel through a freewheeling diode and the second switching device.

The two-step voltage-reduction approach to noise reduction in switched reluctance motors discussed above suffers from several limitations and disadvantages. One such limitation is that in many cases the two-step voltage-reduction approach requires precise switching of the switching devices within the interval defined by the turn-on and turn-off angles (i.e., the angular interval during which the phase winding is energized). Still further, the two-step voltage-reduction approach limits the flexibility to dynamically adjust the freewheeling period for each phase cycle. As discussed above, in the two-step voltage-reduction approach, the duration of the freewheeling period is optimized to reduce the noise produced by the system at a single fundamental frequency. There are many instances when it would be desirable to optimize the freewheeling duration according to other criteria.

An additional limitation of the two-step voltage-reduction approach, and other approaches that utilize freewheeling to reduce noise, is that, since there is typically only one freewheeling period per phase energization cycle, freewheeling generally reduces noise produced by only a single frequency of the motor system. Freewheeling to reduce noise at one frequency does not reduce noise produced at other frequencies, in motor systems that have multiple resonant frequencies. Accordingly, such approaches do not reduce many sources of unwanted noise. A further disadvantage with the freewheeling approaches is that there are several motor control systems (e.g., H-circuits with a split capacitor, third-rail circuits, ring circuits and the like) that simply do not allow freewheeling. These systems cannot use freewheeling to reduce noise.

The present invention overcomes many of the limitations and disadvantages associated with known systems and provides a unique method and apparatus for controlling the phase voltage and the phase winding currents in a phase windings of a switched reluctance machine to, for example, reduce unwanted machine noise and vibrations.

SUMMARY OF THE INVENTION

One aspect of the present invention concerns a method and apparatus for controlling the average voltage applied to a phase winding of a machine, particularly a reluctance machine, during a period of current increase, and a period of current decrease, to improve machine performance by reducing abrupt changes in the phase current and the magnetic flux associated with the phase or with one or more adjacent energized phases. One aspect of this improved performance is a reduction in audible noise and vibration generated by the machine. Audible noise and vibration are generated in a reluctance machine in part as a result of rapid changes in the magnetic flux which tend to distort or ovalize machine parts. Controlling the rate of change in the voltage and current in phase windings during the periods when a winding is energized from a zero or near-zero voltage state to a maximum voltage state, or from a maximum voltage state to a zero or near-zero voltage state, can result in less rapid change in the magnetic flux, thereby reducing audible noise and vibration.

An exemplary apparatus of the present invention concerns a controller and associated circuitry. The method of the present invention concerns a series of steps performed by the controller which govern the duty cycle of voltage pulses applied to a phase winding during current increase and current decrease, as a function of the speed and torque output and requirements of the reluctance machine.

The controller contains circuitry which can operate in several distinct modes. The different modes may be selected based on the output requirements of the system, e.g. speed or torque requirements. The controller may operate in a single mode, or may be programmed to change modes based on the actual operating characteristics of the machine. The different modes define the optimum rotor angular positions at which the phase windings are energized and de-energized, in accordance with the desired speed and/or torque performance of the machine. The controller also contains circuitry which controls the voltage applied to the phase at the time the windings are energized, until a desired maximum current is reached. The circuitry may include a microprocessor which determines the maximum current desired in the phase winding based on feedback signals representing the actual speed and torque of the machine.

In one exemplary embodiment, from the time when the phase is energized, until the time when the maximum current is reached in the phase, the average voltage applied to the winding is controlled using soft-chopping techniques, i.e., switching the phase winding between a circuit which applies a positive DC voltage and a circuit which applies a zero voltage, thereby allowing the current in the phase winding to freewheel and decrease slowly. In this embodiment, the soft-chopping duty cycle is calculated as a function of the angular speed of the rotor and the torque generated by the machine, and the desired speed or torque of the machine. As a result, the gradient of the increasing current in the phase winding will vary with the speed and torque of the machine.

In another embodiment, from the time when the phase is at its desired maximum current, until the time when the phase is de-energized, soft-chopping techniques are continued to maintain the current at the desired level. Alternative methods of controlling the current level can be applied, such as hard-chopping techniques, whereby the phase is switched between a circuit which applies a positive DC voltage and a circuit which applies a negative DC voltage, thereby quickly driving the current in the winding to zero.

In an exemplary embodiment, at the time when the phase is de-energized, until the time when the current in the phase is at or near zero, the average voltage applied to the winding is controlled by using hard-chopping techniques. An aspect of this embodiment is to calculate an initial duty cycle for the applied voltage pulses which is a function of the last soft-chopping duty cycle, and to apply a net average voltage to the phase winding in the first hard-chopping duty cycle which is the same as the net average voltage at the time the phase was de-energized. It is also an aspect of this embodiment that the duty cycle of the hard-chopping pulses, during the time period when the current in the phase is decreasing, is modified and controlled such that the net average voltage applied to the winding changes from a positive DC voltage, to zero voltage, to a negative voltage, until the current in the windings reaches zero or a desired value near zero. The rate of change of the duty cycle varies as a function of the angular speed of the rotor and the torque generated by the machine, and the desired speed or torque of the machine. As a result, the gradient of the decreasing current in the phase winding will vary with the speed and torque of the machine.

In other exemplary embodiments, where the current in the phase prior to de-energization is controlled by either hard chopping or soft chopping, the last complete duty cycle or net average voltage prior to de-energization is captured and the same hard chopping or soft chopping switching strategy is continued with the duty cycle ramped down from a positive net average voltage to zero or a net negative voltage. Thereafter, at one or more predetermined times or at a one or more preselected rotor positions during the period where the duty cycle is ramped down, the duty cycle may be captured again, and the switching strategy may be changed again. This could include changing switching strategies such that a hard chopping duty cycle is applied, starting with the same net average voltage as the prior duty cycle but ramped down at a different rate, or actuating both switches into a non-conducting state thereby applying the full negative voltage. It will be evident to one skilled in the art that the controller of the present invention can combine the various possible switching strategies during the period after the phase winding is de-energized in many possible combinations other than those discussed above.

The controller of the invention can perform these techniques for controlling the rate of current increase and current decrease in a single phase winding of a reluctance machine or other device in which current is controlled as a function of a rotor position, or in multiple phase windings. The control apparatus and methods are applicable to any method of operation, and any method of determining the rotor positions at which the phase is energized and de-energized, since the rotor speed and machine torque are factored into the duty cycle of the applied voltage pulses required.

BRIEF DESCRIPTION OF THE DRAWINGS

Other aspects and advantages of the present invention will become apparent upon reading the following detailed description and upon reference to the drawings in which:

FIG. 5B illustrates a typical maximum applied average voltage (defined by a simplified HARD-RAMP-START duty cycle) vs. torque output calculation for various speeds.

FIG. 6B illustrates exemplary curves for selecting a RAMP-DOWN-GRADIENT, which defines the rate of change in the net average voltage applied to the winding, as a function of machine speed and torque.

FIGS. 9A and 9B compare a traditional current waveform (FIG. 9A) with a current waveform generated through use of the methods and apparatus of the present invention (FIG. 9B).

Similar reference characters indicate similar parts throughout the several views of the drawings.

DETAILED DESCRIPTION OF THE INVENTION

Although the present invention is discussed in terms of a system which includes a reluctance machine, the method and apparatus may be applied to many other machine systems in which current is applied to a winding or coil as a function of a rotor or armature position, including various inductance motor systems, stepper motor systems, and other motor or generator systems. Turning to the drawings and referring to FIG. 1, one example of a system 10 that may be used to implement the methods of the present invention is illustrated in block form.

As illustrated, an electronic controller 40 receives signals from a rotor position transducer ("RPT") 3. The RPT 3 detects the angular position of the rotor of a reluctance machine 20 and provides a controller 40 signals representative of the rotor's position. RPT 3 may comprise optical or magnetic sensor(s) and may be of conventional construction. Embodiments are envisioned wherein the RPT is replaced by circuitry that monitors the electrical characteristics of the phase winding and provides signals representative of the rotor's angular position and/or speed without the use of position sensors. One such sensorless approach is disclosed in the currently pending application Ser. No. 08/549457, "Rotor Position Sensing in a Dynamoelectric Machine Using Coupling Between Machine Coils" filed Nov. 27, 1995, assigned to the assignee of the present invention.

Figure 1:
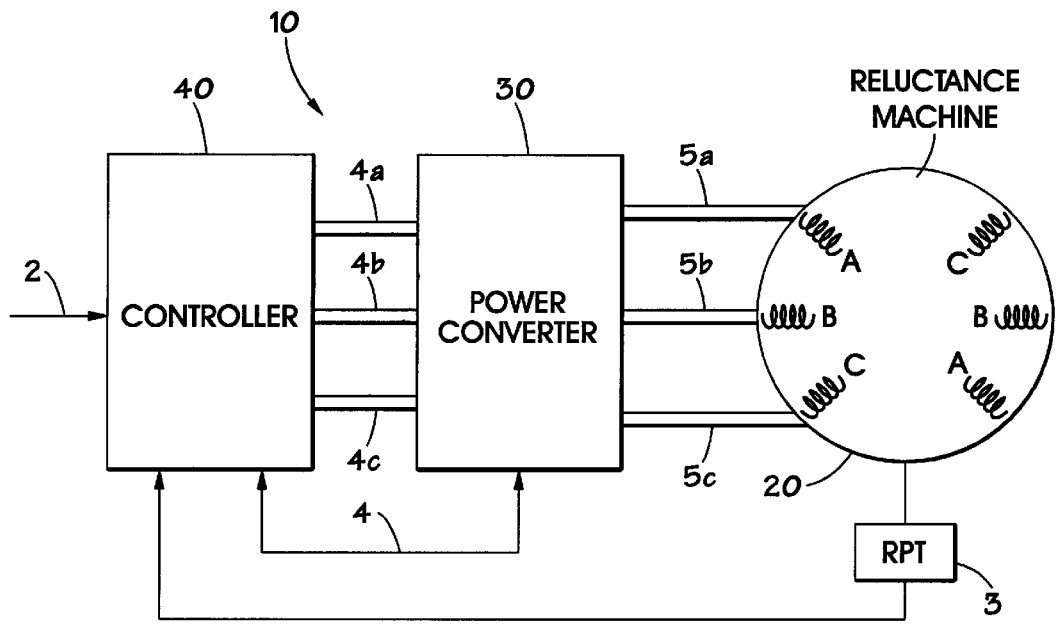
FIG. 1 illustrates a reluctance machine system in accordance with the present invention.

In the embodiment of FIG. 1 the controller 40 derives an indication of the angular speed of the rotor of the reluctance machine 20 by appropriately processing the position information provided by the RPT 3. Alternate embodiments are envisioned wherein a separate tachometer or similar device provides speed information to the controller 40.

In addition to receiving signals from RPT 3 concerning the rotor's position and angular speed of the machine, controller 40 also receives via line 4 feedback signals from a power converter 30. In one embodiment, the feedback signals represent the currents that are supplied by the power converter 30 to the phase windings of the rotor. The controller also receives an externally generated signal on line 2 corresponding to the required torque or speed of the machine 20.

In response to the rotor position signals from RPT 3, the feedback signals from a power converter 30 and the torque/speed command on line 2, the controller 40 provides switching signals (sometimes referred to as "firing signals") via lines 4a–4c to a number of power switching devices that comprise a power converter 30. The switching devices in the power converter 30 are connected via lines 5a–5c to three phase windings A, B and C of a three phase switched reluctance machine 20. The three phase windings of the machine (A, B, and C) are schematically illustrated in FIG. 1. Those skilled in the art will recognize that although a three phase machine has been shown for illustrative purposes, machines with more or less than three phase windings can be used. The present invention applies equally to such machines.

In general, the electronic controller 40 responds to the position signals from the RPT 3 by generating firing signals for each of the three phases of the motor to switch the power devices in power converter 30 such that the phase windings A, B and C are energized in the proper sequence over angular periods of rotor rotation to produce torque in a desired direction.

Figure 2:
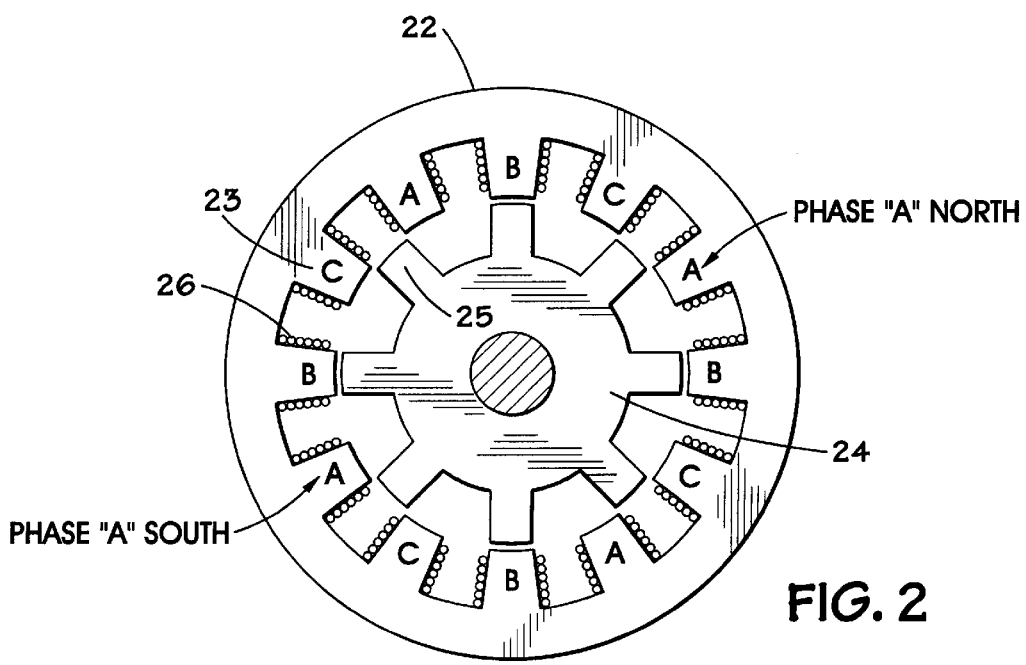
FIG. 2 illustrates in greater detail the reluctance machine 20 of FIG. 1.

FIG. 2 illustrates in greater detail the three phase reluctance machine 20 of FIG. 1.

In general the reluctance machine 20 consists of a stator 22 that is constructed according to known techniques from a stack of stator laminations that define twelve inwardly projecting stator poles 23. These poles define a principal stator axis (extending outwardly from FIG. 2). A rotor 24 is coupled to a rotatable shaft (not shown) that is co-axial with the principal axis of the stator. The shaft is mounted on bearings and is free to rotate. The rotor 24 is formed from a stack of rotor laminations that define eight outwardly projecting rotor poles 25.

Associated with each stator pole 23 is a wound coil of wire 26a, 26b and 26c. The coils of opposing stator poles are placed such that current flowing in the opposing stator poles at the same time will establish inwardly pointing electro-magnetics of opposite polarities.

In the reluctance machine of FIG. 2, sets of coils associated with opposing stator poles 23 are coupled together to form three phase windings A, B and C where each phase winding is comprised of four coils 26 and where each phase is associated with four stator poles 23. The terminating ends of the three phase windings A, B and C are coupled to the output of power converter 30 via connection lines 5a, 5b and 5c.

When electric current flows though the phase windings of a given phase (e.g., phase winding A) two sets of opposing electro-magnetics of opposite polarity will be established in the machine. This is illustrated in FIG. 2 by the references to Phase $A_{NORTH}$ and Phase $A_{SOUTH}$ electro-magnets which will be established when electric current is flowing in a given direction in the phase winding A. The electro-magnets established by this current will produce a force of attraction between the energized stator poles 23 and the rotor poles 25 which will produce a torque. By switching energization from one phase winding to another, the desired torque may be maintained regardless of the angular position of the rotor. By switching the energization of the phase windings to develop positive torque, the machine may be operated as a motor; by energization of the phase windings to develop a negative torque the machine may be operated as a brake or generator. The magnitude of the produced torque can be controlled by controlling the current in the energized phase winding which controls the strength of the established electro-magnetic field.

For the sake of illustration, a three phase machine having twelve stator poles and eight rotor poles (i.e. a 12/8 machine) has been shown. Those skilled in the art will recognize that other combinations (e.g., 6/2, 6/4, etc.) are possible and that machines with more or less than three phase windings can be used. The present invention applies equally to such machines. Moreover, the present invention is applicable to inverted machines, where the stator is positioned within the bore of an outer rotating rotor, and to linear machines, where the rotor moves linearly with respect to the stator.

As discussed in connection with FIG. 1, the phase windings of the reluctance machine are energized by the application of power to the phase windings by power converter 30. Power converter 30 is illustrated in greater detail in FIG. 3A.

Figure 3A:
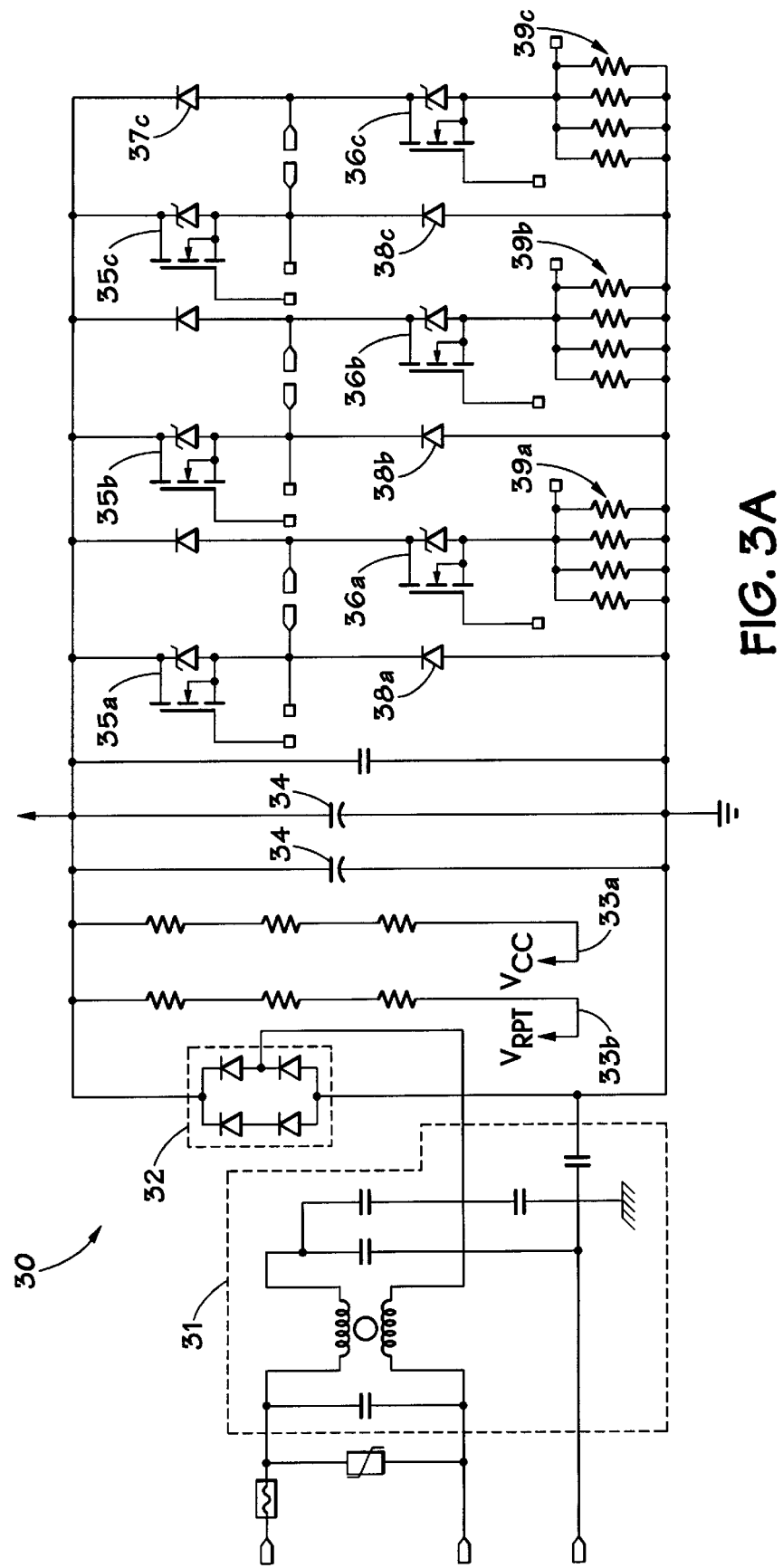
FIG. 3A illustrates in greater detail the power converter 30 of FIG. 1.

Turing to FIG. 3A, AC power is supplied to the power converter 30 by input power lines AC+ and AC−. An earth ground may also be applied to the power converter 30 via a GND line. An appropriately sized electro-magnetic interference ("EMI") filter 31 receives and conditions the input AC power before supplying it to a full-wave rectifier 32.

Although not illustrated in FIG. 3A, front-end power protection circuitry may be used to prevent damage to the components of the power converter 30. For example, a fuse rated to the maximum allowable amperage may be placed in series with one of the AC+ or AC− power lines or a motor thermal cut off may be coupled to the EMI filter 31 to cut power off to the reluctance machine 20 in the event that excessively high temperatures are detected in the vicinity of the machine 20 or the power converter 30.

The full-wave rectifier 32 receives the AC power and converts in to DC power such that high voltage DC power is available on high voltage DC bus lines +HVDC and $HVDC_{Common}$. Parallel connected DC bus capacitors 34 are used to filter the output of the full wave rectifier 32 and to provide a DC voltage across the high voltage DC bus. While the absolute magnitude of the DC voltage provided across the DC bus will vary depending of the power rating of a given power converter the DC voltage across the high voltage DC bus can reach levels of 160 Volts for 110 Volt AC input and over 300 Volts for 220 Volt AC input.

Auxiliary DC power supplies consisting of a string of appropriately sized resistors may be driven from the high voltage DC bus. In the example of FIG. 3A a 5 Volt Vcc signal for powering the controller 40 is provided by resistor chain 33a. A similar resistor chain 33b provides a source of 5 Volt power to the RPT 3.

Although not illustrated in FIG. 3A additional EMI or appropriate under voltage detectors (e.g., a resistive chain with a resistive/capacitive load) could be coupled across the high voltage DC bus. Such elements are not particularly related to the subject matter of this disclosure and are within the understanding of one of ordinary skill in the art and are thus not discussed in detail herein.

Coupled across the high voltage DC bus are power switching devices and diode "groups" where each group is associated with one of the three phases of the reluctance machine 20. Specifically, each group includes an upper power switching device 35, a lower power switching device 36, an upper fly-back diode 37 and a lower fly-back diode 38. A current measuring sense resistor arrangement 39 is associated with each of the power switching device groups. These current measuring sense resistor arrangements 39a, 39b and 39c provide voltages that corresponds to the current flowing through the phase windings associated with each arrangement. As discussed more fully below, these "current feedback" signals may be used by the controller 40 to control the current in the phase windings.

In the embodiment of FIG. 3A, each of the current measuring sense resistor arrangements 39a, 39b and 39c consists of a number of parallel connected resistors. This arrangement is beneficial in some applications because it allows for the use of lower power rated (and thus less expensive) resistors. A single resistor of appropriate value could also be used.

The power switching devices 35 and 36 may comprise any suitable power switching devices such as MOSFETs, IGBTs, bi-polar transistors, SCRs or a combination of the above. For example, if only the upper switches will be modulated for current control, then fast switching power MOSFETs can be used for the upper switching devices 35 and slower switching (but lower loss) IGBT devices can be used for the lower power switching devices 36.

By controlling the actuation of the power switching devices 35 or 36, different voltage potentials can be established across the phase winding to which the appropriate group is coupled.

Figure 3B:
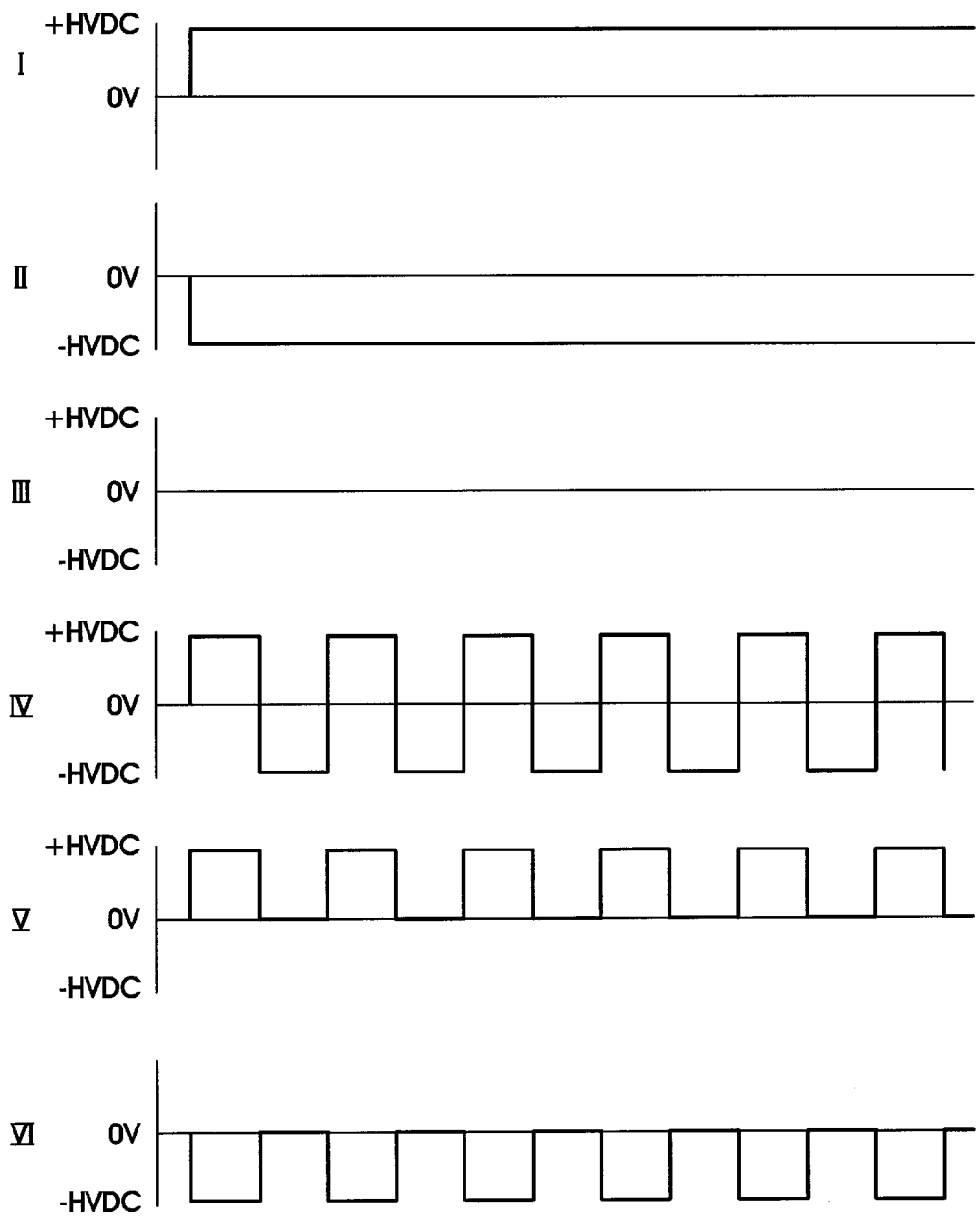
FIG. 3B illustrates the types of voltages that may be established across a phase winding in a reluctance machine by power connector 30.

FIG. 3B illustrates the types of voltages that may be established across a phase winding coupled to one of the power switching groups of FIG. 3A. Using the Phase A group as an example, FIG. 3B(I) illustrates the voltage that will be established across Phase winding A when both the upper power switching device 35a and the lower power switching device 36a are actuated into a conducting (or "closed") condition. When switches 35a and 36a are so actuated, the phase winding is coupled across the high voltage DC bus and (ignoring losses introduced by the switching devices) the voltage across Phase A winding is substantially equal to the high voltage DC bus voltage (+HVDC).

FIG. 3B(II) illustrates the voltage that will appear across the Phase A winding when both of the power switching devices 35a and 36a are actuated into a non-conducting (or "open") configuration when current is flowing in Phase winding A. Because of the large inductance of the Phase winding, the current in the winding cannot instantaneously change, and the current will thus continue to flow through the winding via the fly-back diodes 37a and 38a. Because both the upper and lower fly-back diodes are conducting in this arrangement, the voltage applied across Phase winding A winding is substantially the negative of the high voltage DC bus voltage (−HVDC).

FIG. 3B(III) illustrates the voltage that will appear across Phase winding A when either the upper or the lower power switching devices 35a or 36a (but not both) is actuated into a non-conducting state while the other is in a conducting state, and current is flowing in the phase winding. In this arrangement, because the current cannot instantaneously change, the current will continue to flow through the conducting power switching device and through the fly-back diode associated with that power conducting device. For example, if the lower power switching device 36a is actuated to a non-conductive state, current will continue to flow through the upper power switching device 35a and through the upper fly-back diode 37a. Similarly if the upper switching device 35a is actuated to a non-conductive state, current will continue to flow through the lower power switching device 36a and lower fly-back diode 38a. In either arrangement, the total voltage across the Phase A winding (again ignoring losses introduced by the switching devices and diodes) will be approximately zero volts. This arrangement, where current is circulating through the winding with approximately zero volts across the winding, is sometimes referred to as a "freewheeling" arrangement since the current "freewheels" through the winding.

By controlling the actuation of the power switching devices it is possible to implement various switching schemes. For example, as illustrated in FIG. 3B(IV), the upper and lower switching devices can both be alternately actuated to be conductive and non-conductive, simultaneously causing the voltage across the phase winding to vary from +HVDC to −HVDC. This scheme is sometimes referred to as "hard-chopping." By appropriately selecting the ratio of time for which the +HVDC voltage is applied to the phase winding as opposed to the −HVDC voltage, the net average voltage applied to the phase winding may be either positive or negative such that the current in the phase winding may be controlled to increase or decrease.

FIG. 3B(V) illustrates an alternate switching scheme that may be used to control the average voltage applied to the phase winding. In this switching scheme, either: (i) the upper power switching device 35a is left in a conducting state while the lower power switching device 36a is alternately switched from a conducting to a non-conducting state or (ii) the lower power switching device is left in a conducting state while the upper switching device 35a is alternately actuated between conductive and non-conductive states. In addition, the power switching device that is left in a conducting state and the power switching device that is switched between a conducting and a non-conducting state, can be alternated. For example, the upper power switching device 35a, may be left in the conducting state for one cycle while the lower power switching device 36a is alternately opened and closed, and the following cycle the lower power switching device 35a, may be left in the conducting state while the upper power switching device 36a is alternately opened and closed. Alternately, freewheeling may be implemented on other than a per cycle basis. This alternating of the power switching devices results in reduced switching frequency, extended service life of the devices, reduced switching and system losses, and allows the use of slower switching devices.

In this switching scheme the voltage applied across the phase winding varies from +HVDC to 0 Volts. This type of switching scheme, where the voltage varies from a given value to zero, is sometimes referred to as "soft-chopping." In the soft-chopping scheme of FIG. 3B(V) where the voltage across the phase winding varies from +HVDC to 0 the net average voltage applied to the phase winding can be controlled to be a desired positive, but not a negative, value.

FIG. 3B(VI) illustrates a soft-chopping scheme in which, while current is flowing in the phase winding, either: (i) the upper power switching device 35a is left in a non-conducting state while the lower power switching device 36a is alternately switched from a conducting to a non-conducting state or (ii) the lower power switching device is left in a non-conducting state while the upper switching device 35a is alternately actuated between conducting and non-conducting states. The alternating of the power switching device that is left in a non-conducting state and the power switching device that is switched between a conducting and a non-conducting state, discussed above, applies equally in this switching scheme with the same resulting benefits. In this switching scheme the voltage applied across the phase winding varies from −HVDC to 0 Volts. In the soft-chopping scheme of FIG. 3B(VI) where the voltage across the phase winding varies from −HVDC to 0 the net average voltage applied to the phase winding can be controlled to be a desired negative, but not a positive, value.

The particular switching scheme used for actuating the power switching devices 35a–c and 36a–c in the power converter of FIG. 3A is determined by the switching signals applied to the gates of the power switching devices by the controller 40. Controller 40 is illustrated in greater detail in FIGS. 4A and 4B.

Figure 4A:
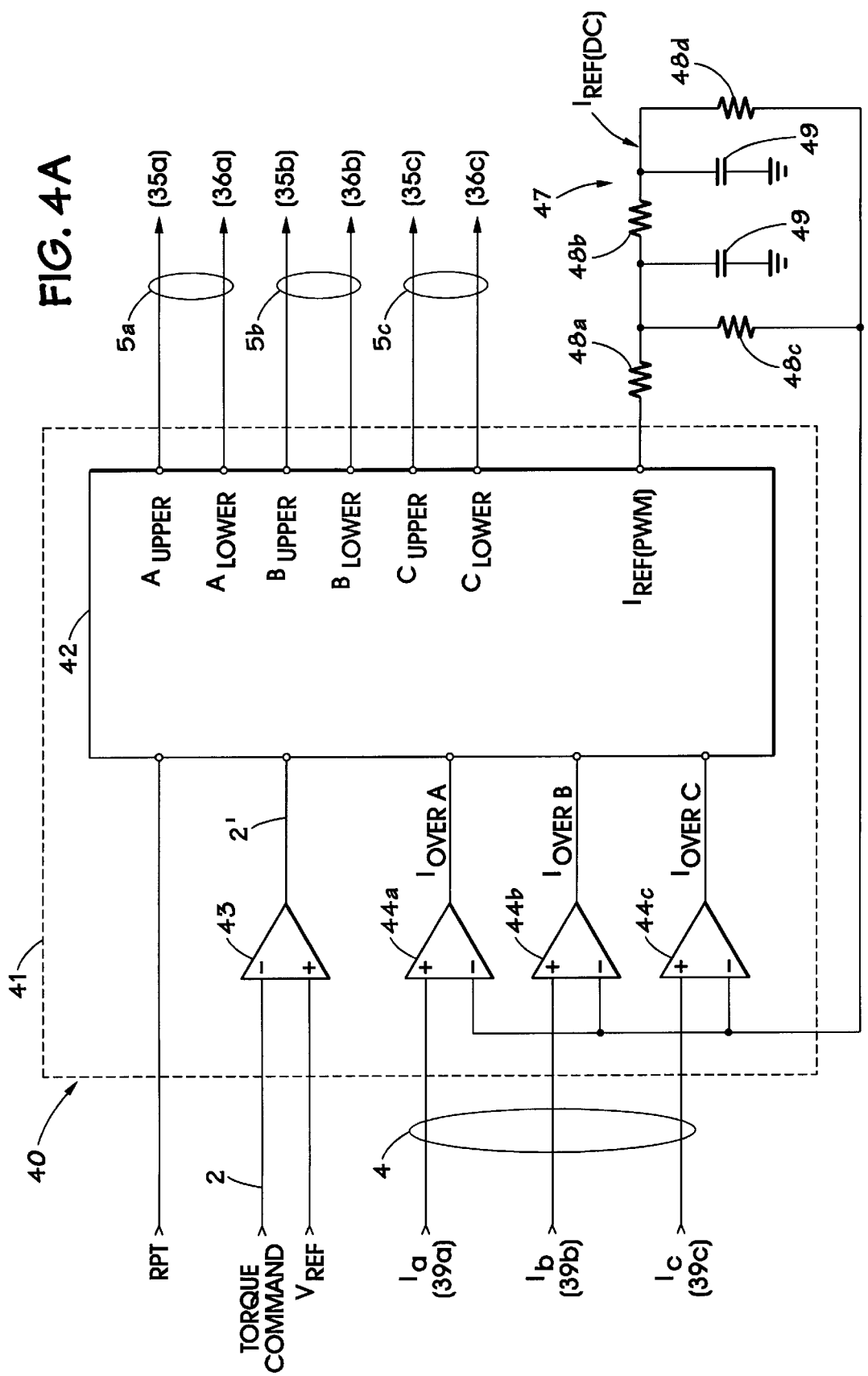
FIGS. 4A and 4B illustrate in greater detail the controller 40 of FIG. 1.

Referring to FIG. 4A, the controller 40 comprises a semiconductor integrated circuit chip 41 (indicated by the dashed box) and associated external circuitry. In the embodiment of FIG. 4A the semiconductor integrated circuit chip 41 comprises a digital core 42 that is surrounded by additional circuit elements including comparators 43 and 44a–44c. Comparators 43 and 44a–44c are "digital comparators" in that the output of the comparators is either a logic level one (when the voltage at the +input to the comparator is greater than the voltage at the −input to the comparator) or logic level 0 when the converse is true.

Control chip 41 may be an integrated circuit chip that includes a properly programmed microprocessor or microcontroller. In one embodiment, the control chip 41 consists of an application specific integrated circuit chip ("ASIC") that is coupled to an external electrically erasable programmable read only memory ("EEPROM") that includes operational data and instructions from which a controller within the ASIC can operate.

While the embodiment of FIG. 4 illustrates many of the components of the controller as located on chip 41 the components of the controller could be placed on a number of discrete chips, or analog circuits could be used.

The control chip 41 receives as input the output of the RPT 3 that indicates the angular position of the rotor. The precise form that the RPT input takes will vary depending on the specific type of RPT used to detect the rotor position. For example, the RPT input could consist of a digital word representing the actual position of the rotor (if a digital position encoder is used as an RPT) or simply pulses that indicate that the rotor has rotated through a preestablished angular period. In any event, the various possible forms of the RPT and the reception of RPT signals to provide both rotor position and angular speed information will be well known to one of ordinary skill in the art, and will not be addressed herein in detail.

In addition to receiving the RPT signals as an input, the control chip 41 also receives via line 2 the externally derived signal representing the desired speed or torque of the machine. For purposes of discussion it will be assumed that the externally applied signal on line 2 is a representation of the desired torque output of the machine although those skilled in the art will appreciate that the control methods and apparatus discussed herein are also applicable to speed control signals.

The externally generated signal representing the desired torque output of the machine is received by the chip 41 via line 2 and, in FIG. 4A, is compared to a reference voltage VREF in comparator 43 to produce a modified torque demand signal on line 2'. In the embodiment of FIG. 4A it is assumed that the externally supplied torque demand signal is a pulse width modulated (PWM) signal where the duty cycle of the PWM signal corresponds to the ratio of the demanded torque to the maximum torque available from the machine. In this embodiment, the magnitude of the $V_{REF}$ voltage signal is set to a level that is between the logic zero and logic one levels that define the PWM signal. Thus, the signal appearing on line 2' is a PWM torque demand signal that has a duty cycle that corresponds to the duty cycle of the externally supplied PWM torque demand signal received on line 2.

For certain systems, the externally supplied torque demand signal on line 2 will not be a PWM signal but will instead be an analog signal whose voltage magnitude corresponds to the desired torque output of the system. The controller of the present invention is capable of receiving and operating from such signals with little or no modification. A circuit that would enable the controller 40 of the present invention to receive an analog signal is illustrated in greater detail in FIG. 4B.

Figure 4B:
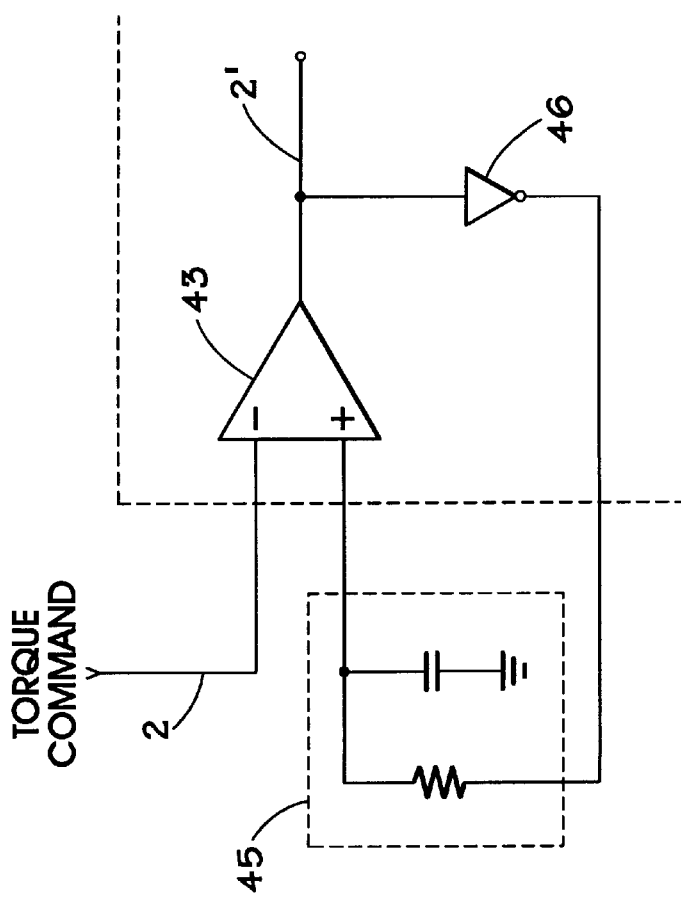

In FIG. 4B only the portion of FIG. 4A relevant to the reception of the externally supplied torque demand signal is illustrated. In general, the circuitry of FIG. 4B is the same as that of FIG. 4A except that a resister/capacitor ("RC") filtering network 45 is coupled to the inverter output of comparator 43. For purposes of illustration the inverted output of comparator 43 is illustrated as being supplied by an inverter 46. This inverted signal may be alternately generated in the digital core 42 of control chip 41 and provided via an external pin. When an analog signal is received on line 2 that is greater than the voltage at the non-inverted terminal of comparator 43, the inverted output of the comparator 43 will be logic high or positive. This positive voltage will cause electrical current to flow into the RC network 45, charging the capacitor at a rate defined by the RC time constant of network 45. Eventually, the voltage across the capacitor (which is applied to the non-inverting terminal) will exceed the input analog voltage of control chip 41 and the output of converter 43 will switch states, causing the inverted output to go to logic zero (ground) thus draining the charge off of the capacitor. Eventually the voltage across the capacitor will fall below that of the analog voltage applied on line 2 and the output of the converter 43 will again switch states.

In one embodiment, the signal on line 2' is applied as a control signal to an up/down counter that is clocked at a given frequency, such that the counter counts up when the signal on line 2 is logic high and counts down when the signal is logic low. In this embodiment, the output at the counter corresponds to the speed or torque command signal.

Referring again to FIG. 4A, the digital core 42 of the controller 40 receives the RPT information and the PWM torque command on line 2 and, based on this information, determine the appropriate firing signals to be supplied via lines 5a, 5b and 5c to the power switching devices of power converter 30. The precise manner in which the control circuit generates the firing signals depends on the control mode in which the control chip is operating.

The control chip 41 is capable of operating in several distinct control modes including: (i) "$L_{MIN}/L_{MAX}$ Mode"; and (ii) "2/3 Mode," and (iii) "Full Angle Control Mode." The precise mode in which the control chip 41 is operating determines the type of firing signals that are applied to the power switching devices in the power converter 30.

In the $L_{MIN}/L_{MAX}$ Mode the energization of the phase windings is accomplished over an "active cycle" that is defined by predetermined $T_{ON}$ and $T_{OFF}$ angles. When the $L_{MIN}/L_{MAX}$ Mode is selected, the $T_{ON}$ angle for a given phase winding corresponds to the angular position of the rotor with respect to the stator when the inductance of the phase winding is approximately at its minimum value, $L_{MIN}$. In this mode, the $T_{OFF}$ angle for the phase winding corresponds to the angular position of the rotor when the inductance of the phase winding is roughly at its maximum $L_{MAX}$. In one embodiment of the present invention each $L_{MIN}$ or $L_{MAX}$ point of the three phase windings is associated with a specific output signal from RPT 3. In such an embodiment, the controller (when operating in $L_{MIN}/L_{MAX}$ Mode) initiates the active cycle for a given phase winding when the $L_{MIN}$ signal for that phase winding is received and terminates the active cycle when the appropriate $L_{MAX}$ signal is received.

While the $T_{ON}$ and $T_{OFF}$ angles for the phase windings are set and unchanged in the $L_{MIN}/L_{MAX}$ Mode, the peak magnitude of the current that is allowed to flow in each phase winding during its active cycle is allowed to vary as a function of the torque demand signal received by the digital core on line 2. Specifically, the digital core 42 includes a circuitry for selecting an $I_{ref(pwm)}$ signal that corresponds to a PWM desired duty cycle defining a desired peak current for a given speed/torque combination. As those skilled in the art will appreciate, the relationship between torque and current in a reluctance machine is not linear and can vary with the speed of the machine. As such, controller 40 includes circuitry that receives the torque demand and speed information and selects an appropriate $I_{ref(pwm)}$.

In one embodiment of controller 40, $I_{ref(pwm)}$ data for various speed and torque points is stored in a sparse matrix stored in memory accessible to the controller 40. In this embodiment the speed/torque information is used to address the matrix memory. For speed/torque points for which no stored data is available, interpolation routines may be used to calculate appropriate $I_{ref(pwm)}$ data.

Alternate embodiments are envisioned where the $I_{ref(pwm)}$ duty cycle signal is calculated from speed and torque data or where curve fitting techniques are used to define an equation for $I_{ref(pwm)}$ based on measured data.

Referring to FIG. 4A, the $I_{ref(pwm)}$ signal generated by the digital core is provided via a pin on the control chip 41 to an external RC filtering network 47 such that an analog signal corresponding to the desired peak active cycle current I ref$_{(DC)}$ is generated. The precise size and structure of the RC network 47 will vary depending on the frequency and magnitude of the $I_{ref(pwm)}$ signal on the particular application. In one embodiment, the frequency of the $I_{ref(pwm)}$ signal is approximately 40 Khz, and the RC network 47 consists of resistors 48a–48d and two capacitors 49 where the values of the resistors are, respectively, 2.2 K Ohms, 100 K Ohms, 20 K Ohms and 20 K Ohms, and where the capacitance value of the capacitors 49 is 100 nano-farads.

The single analog signal representing the desired peak current value is provided via an input pin to comparators 44a, 44b and 44c where it is compared with the feedback current signals from the three phase windings A, B and C. The comparators 44a, 44b and 44c provide an indication of whether the respective phase currents are greater than or less than the desired peak current reflected by the Iref$_{(DC)}$ signal. It should be noted that the use of a single pin to receive a single Iref$_{(DC)}$ signal that is compared to each of the phase winding currents simplifies the construction and reduces the cost of control chip 41 since individual current references are not required for each of the different phase windings.

As discussed more fully below, in the $L_{MIN}/L_{MAX}$ Mode, the control chip 41 receives the current comparison signals and controls the firing signals for the power switching devices such that, when a phase is in its active cycle, the current in the phase winding will be maintained at a level approximately equal to the level corresponding to the Iref $_{(DC)}$ signal. In one embodiment of the present invention, the current in the phase winding during an active cycle is maintained by a fixed frequency soft chopping technique wherein the power switching devices associated with an active phase winding are both actuated into a conducting state when the current in the phase winding is below the desired peak level reflected by the Iref$_{(DC)}$ and one of the power switches is rendered non-conductive to allow freewheeling when the current in the active phase winding exceeds the desired peak current level.

The fixed frequency soft-chopping control scheme discussed above is only one method in which current control can be accomplished during the active cycle. Hard-chopping techniques can also be used, although such hard chopping techniques will, for the same number of "chops", result in approximately twice the switching losses since two switches must be activated for each chop. Alternate forms of soft chopping may also be used. For example, the power switching device that is left in a conducting state and the power switching device that is switched between a conducting and a non-conducting state can be made to alternate to reduce switching system losses, extend the service life of the devices, and allow the use of slower switching devices.

The $L_{MIN}/L_{MAX}$ Mode discussed above is most suitable for operation of the reluctance machine 20 at relatively low speeds where the inductance increases relatively slowly allowing a current to be established in the winding relatively quickly. At high speeds where the inductance changes more rapidly over time, application of fixed duty cycle pulses between $L_{MIN}$ and $L_{MAX}$ may result in a current profile in the phase which increases and decreases too slowly, thus torque is not easily controlled. The $L_{MIN}/L_{MAX}$ mode may be limited for use at relatively low speeds only. As an example, in one application of the control system of the present invention, the $L_{MIN}/L_{MAX}$ Mode is used for rotational speeds up to 375 RPM.

As the rotational speed of the rotor increases, the negative torque that is generated by the current that remains in an energized phase winding after the $L_{MAX}$ position can result in inefficient motor performance. As such, as the rotational speed of the rotor begins to increase, it may be desirable to end the active cycle of a given phase winding prior to the $L_{MAX}$ position. In the "2/3 Mode", the controller 40 of the present invention ensures that this occurs by defining the $T_{OFF}$ angle for each phase winding to be the rotor position that is 2/3 of the angular distance between the $L_{MIN}$ and $L_{MAX}$ positions. At this 2/3 point which occurs prior to $L_{MAX}$, current in the winding can be reduced relatively slowly, while normal forces are low, rather than quickly driven to zero. In one embodiment of the system of the present invention this 2/3 point corresponds to a specific RPT output signal. In one embodiment, the $T_{ON}$ angle for an active phase in the 2/3 Mode is the same as that in the $L_{MIN}/L_{MAX}$ Mode (i.e., $L_{MIN}$), but it could also be selected independent of the $L_{MIN}/L_{MAX}$ Mode.

While the $T_{ON}$ and $T_{OFF}$ positions are fixed in the 2/3 Mode, the peak desirable current is allowed to change as a function of the torque demand signal. The method used by controller 40 for setting the peak desirable current and indicating whether a given phase winding current exceeds this value is that same as that previously described above in connection with the $L_{MIN}/L_{MAX}$ Mode.

While $L_{MIN}/L_{MAX}$ Mode is best suited for low speeds where high torque output of the system is an important consideration, the 2/3 Mode of operation is best suited for operation where higher speeds are expected and system efficiency is key. In 2/3 Mode, the angular speed of the rotor is greater than the speed where the negative torque produced using the $L_{MIN}/L_{MAX}$ Mode begins to reduce efficiency of motor performance, but still sufficiently low that there is enough time between the $T_{ON}$ and $T_{OFF}$ positions for a sufficient number of current chops to be performed such that reliable current control is maintained. As an example, in one application of the present invention, the 2/3 Mode is used for rotor speeds above 375 RPM but less than 1000 RPM. In other applications, the 2/3 mode can be used at very low rotor speeds in place of the $L_{MIN}/L_{MAX}$ mode for better efficiency and lower RMS phase current.

As the rotational speed of the rotor increases further, a point is reached where the motor inductance and counter emf produced limits the amount of current which can be established in a phase winding using either the 2/3 mode or the $L_{MIN}/L_{MAX}$ mode as described above. Further, if a phase winding is de-energized at a $T_{OFF}$ position corresponding to either $L_{MAX}$ or 2/3 the rotational distance between $L_{MIN}$ and $L_{MAX}$, it is difficult to remove current which may remain in the winding after the point of maximum inductance prior to the next energizing cycle of the winding. Chopping may be done at these speeds, but does not provide adequate current control by itself In this situation, the reluctance machine may be controlled in an "Angle Control Mode" where the energization of the phase winding is defined using different switching schemes at different rotor positions or angles. In one embodiment three angles are used to define discrete +HVDC, freewheeling and −HVDC schemes, although other more complicated embodiments are envisioned, using different angles and more or less than three angles. In this "three-angle" example, the three angles that define the energization of a phase winding being controlled in the Angle Control Mode are: (i) the $T_{ON}$ angle that defines the initiation of the active cycle; (ii) a freewheeling angle ("FW") where the current in the phase winding is allowed to freewheel through one of the power switching devices and one of the fly-back diodes associated with the winding; and (iii) the $T_{OFF}$ angle that defines the termination of the active cycle. Unlike in the $L_{MIN}/L_{MAX}$ and 2/3 Modes, the $T_{ON}$, $T_{OFF}$ (and FW) angles are not fixed and can vary with the speed and torque demand of the motor in the Angle Control Mode. Moreover, the rotor positions associated with the $T_{ON}$, $T_{OFF}$ and FW angles often do not correspond to specific RPT signals such that methods must be used to estimate the rotor's position between successive RPT signal changes.

Because the $T_{ON}$, $T_{OFF}$ and FW angles vary as functions of the angular speed of the rotor and of the torque or speed demand of the machine, the controller must be provided with (or generate) appropriate angle parameters for each combination of rotor speed and torque that can be encountered while the controller is operating in the Angle Control Mode. One approach to providing such information is to "characterize" the motor by experimentally running the motor in the Angle Control Mode and determining, for several speed/torque points, the appropriate $T_{ON}$, $T_{OFF}$ and FW angles that provide desirable operating performance at the various points. That data can then be stored in a digital memory associated with control 41 (e.g., a memory located on chip 41 or an external memory addressable and accessible to control chip 41 for use by the digital control core. In one embodiment, the selected angle parameters are stored in a sparse matrix stored in memory accessible to the control chip 41. The controller either operates from the angle parameters associated with the speed/torque point most near the actual speed/torque point or uses an interpolation algorithm to select the appropriate angle parameter data for the actual speed/torque operating point. Alternate embodiments are envisioned where the $T_{ON}$, $T_{OFF}$ and FW angles are calculated or otherwise derived from the speed and torque information available to controller 40.

The precise method that should be used to characterize a motor for operation in the Angle Control Mode will vary from motor to motor and controller to controller. General techniques for performing the characterizing function are known in the art and will not be addressed herein in detail.

Angle Control mode is best suited for high speed machine operation, i.e. when the machine is operating above a predetermined percentage (e.g., between ⅓ and ½) of its maximum operating speed. As an example, in one application of the present invention Angle Control mode is used for control purposes when the angular speed of the rotor exceeds 1000 RPM.

The controller 40 of the present invention may be configured to operate in only one of the operating modes discrotational or to operate in different operating modes depending on the rotational speed of the machine. When the latter approach is desired, the controller can be suitably programmed, by storing the speeds at which a mode change is to occur, in digital memory locations within the controller 40.

As discussed above, abrupt changes in the magnetic flux within the reluctance machine cause unwanted acoustic noise and vibrations. The majority of these abrupt changes occur when the current in a phase winding is decreasing from its magnitude in the active cycle to near zero (the "back-end" of the current waveform), and when the current in an active phase winding is increasing from near zero to its peak value in the active cycle (the "front-end" of the current waveform). The increasing current can cause changes not only in the flux of the energized winding, but may also cause changes in the flux of the adjacent winding which is energized or a phase which is being de-energized. The controller 40 of the present invention can control the net average voltage applied to the current in a phase winding during the active cycle in the three previously discussed modes such that the changes in the magnetic flux in an active phase winding or an adjacent phase winding are reduced, which will reduce unwanted machine noise and vibration.

This current control is accomplished at the front-end of the current waveform by "rampingup" the current in a controlled fashion, and at the back-end of the current waveform by "rampingdown" the current in a controlled fashion. For purposes of discussion, the method and apparatus used by controller 40 to "ramp-down" the current waveform will be discussed first. The following discussion is applicable to all operating modes and is not dependent on the manner in which $T_{ON}$ and $T_{OFF}$ are defined or selected.

The simplest way to drive down the current in an active phase winding at the end of the active cycle for that winding is to actuate both power switching devices associated with that winding into a non-conductive state when the rotor reaches the $T_{OFF}$ position for that active cycle. This technique, however, results in the application of approximately the full −HVDC bus voltage level to the phase winding at $T_{OFF}$ and results in a dramatic change in the net average voltage applied to the winding from a net positive voltage (whatever the voltage was that was used to establish the desired active cycle current) to −HVDC. The abrupt voltage change tends to cause abrupt magnetic flux changes and results in unwanted motor noise and vibration.

Controller 40 is configured to allow the current to "ramp-down" in a predetermined manner such that the current changes in the active phase winding are not abrupt, but are controlled from the point at which the rotor reaches the $T_{OFF}$ angle for the active phase until the current in that phase is reduced to near zero. In general, this is accomplished by implementing a switching scheme where, at $T_{OFF}$, a duty cycle is calculated or captured such that the net average voltage applied to the phase winding just after $T_{OFF}$ is the same as it was at $T_{OFF}$. The duration of the voltage pulses applied to the winding is thereafter controlled such that the net average voltage applied to the winding varies in a controlled fashion from its positive value at $T_{OFF}$ to zero and then to a negative value until the current in the phase winding is reduced to near zero. The result of controlling the voltage pulses applied to the winding is to ramp down the current and the magnetic flux in a smooth manner, while the result of applying the equivalent net average voltage after $T_{OFF}$ is to create slight changes in the current waveform from the point when current starts to be removed from the winding to the point where the current approaches a value near zero. This controlled current change reduces the audible noise and unwanted vibration in the system.

In one embodiment controller 40 uses a soft-chopping scheme to maintain the current in the phase winding at its desired peak value during the active operating cycle. In this embodiment, at $T_{OFF}$, controller 40 will initiate a hard-chopping scheme, applying voltage pulses to drive the current down to zero in a controlled fashion. In one embodiment of the system described herein, the duty cycle of the hard chopping voltage pulses applied to the winding at $T_{OFF}$ is half of the soft chopping duty cycle at $T_{OFF}$, as a percent of the fixed PWM frequency, plus fifty percent. While the following discussion will be limited to a detailed discussion of this embodiment of controller 40, it will be apparent to those of ordinary skill in the art that the devices and techniques discussed herein can be used in conjunction with other chopping or current control schemes.

Figure 5A:
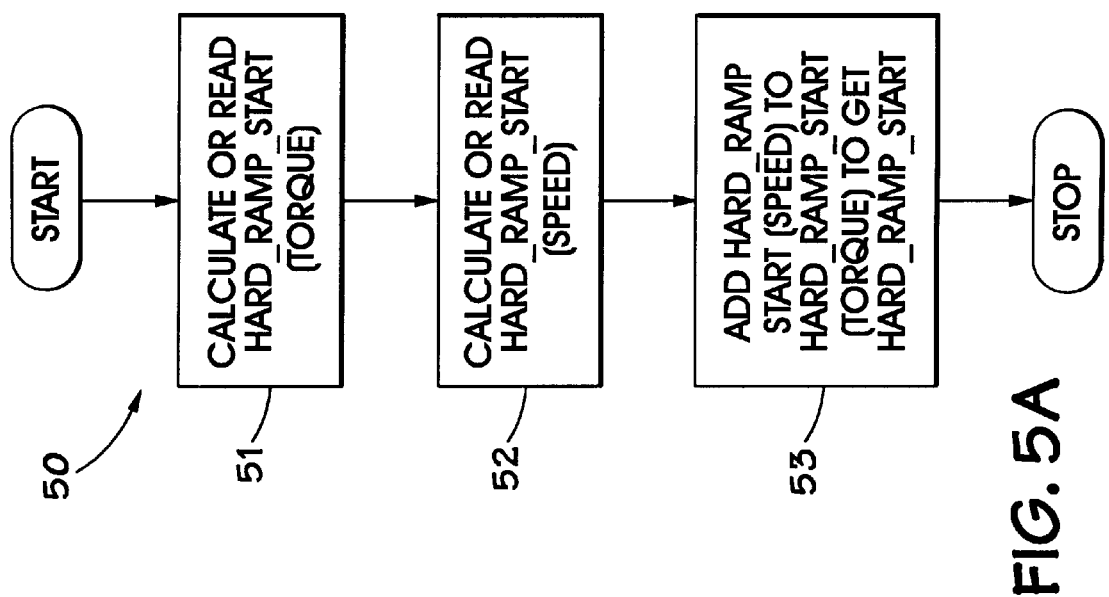
FIG. 5A illustrates in flowchart form a method used by controller 40 for selecting a hard-chopping duty cycle for chopping at the $T_{OFF}$ rotor position.

FIG. 5A illustrates in flowchart form a method 50 in which the control system of the present invention causes the net average voltage applied to the phase winding to change in a non-abrupt and controlled manner from approximately the net average voltage being applied at the $T_{OFF}$ point to −HVDC. The controller 40 accomplishes this by first determining an initial duty-cycle of hard-chopping voltage pulses that corresponds to a net average voltage equal to or near the net average voltage applied at the $T_{OFF}$ point. This initial duty cycle is thereafter adjusted to control the net average voltage applied to the phase winding, and to "ramp-down" the current in a de-energized phase winding through a controlled application of hard-chop voltage pulses.

Prior to the phase winding entering its active cycle, the digital core 42 of controller 40 calculates the initial duty cycle of the hard-chopping pulses that will begin at the $T_{OFF}$ point. This is accomplished in steps 51–53 of FIG. 5A. Since the net average voltage required to establish a desired current magnitude in a phase winding varies with the speed and torque of the machine, for optimum noise reduction, the duty-cycle for which hard-chopping should begin at the $T_{OFF}$ point (which defines the net average voltage at the $T_{OFF}$ point) should vary as a function of both the rotor speed and the machine torque output. As such, the controller 40 of the present invention calculates in step 51 a contribution to the "HARD-RAMP-START" duty cycle (i.e., a contribution to the net average voltage at $T_{OFF}$) as a function of the ratio of the output motor torque to the maximum possible rotor torque. In the specific example of FIG. 5A, the torque-related contribution to the HARD-RAMP-START duty cycle is calculated by a processor in the digital core 42 as a linear function of the torque output where HARD-RAMP-START$_{TORQUE\ CONTRIB.}$=$T_{OUT}/T_{MAX}$ * M+OFFSET, where M represents a desired slope of a representative linear curve and OFFSET represents a desired offset. The precise values of M and OFFSET will vary from machine to machine and may be determined experimentally in a manner similar to the "characterizing" process described above where different M and OFFSET values are tested and the optimal M and OFFSET values for a given machine are determined. M and OFFSET may vary with speed and torque and OFFSET can be zero in some applications. Characterization techniques may be beneficial since the optimum relationship between speed, torque, and the desired net average voltage at $T_{OFF}$ (defined by HARD-RAMP-START) is often not linear, but is instead defined by higher order polynomial equations.

After calculating the torque contribution to the HARD-RAMP-START duty cycle in step 52, the controller 40 of the present invention calculates the speed contribution to the HARD-RAMP-START duty cycle in step 52. This may be done in a manner similar to that previously described above in connection with the torque contribution to the HARD-RAMP-START duty cycle.

The torque and speed contributions to the HARD-RAMP-START duty cycle are summed in step 53 to produce the desired HARD-RAMP-START value for the given speed and torque. The value of HARD-RAMP-START could alternatively be calculated using a single function which intrinsically combines both factors.

Although the above describes methods for calculating the HARD-RAMP-START duty cycle through the use of linear functions, other approaches may be adopted. For example, higher-order equations could be used for calculation purposes, or HARD-RAMP-START data for various speed and torque points could be predetermined and stored in a sparse matrix in the controller 40. As with the angle parameters discussed above, interpolation routines could be used to calculate HARD-RAMP-START values for torque/speed points not pre-stored in the sparse matrix.

While the above examples reflect a HARD-RAMP-START duty cycle that varies linearly with the speed and torque of the machine, non-linear relationships may also be used as well as estimation or adaptive control methods. Such alternate schemes, while requiring more computational overhead could provide better results. FIG. 5B illustrates several possible HARD-RAMP-START duty cycle curves for various speeds and various torque output levels. These curves were determined experimentally for a given reluctance machine by monitoring the noise and voltage produced by the machine and selecting the HARD-RAMP-START duty cycle that, for a given speed and torque point, produced the least unwanted noise. Curves such as those illustrated in FIG. 5B could be experimentally obtained and then stored in a memory accessible to the digital core 42 of controller 4, or curve-fitting techniques could be used to determine the equation that most closely fits the experimentally determined data.

In the controller 40 of the present invention, at the position $T_{OFF}$, hard-chopping at the HARD-RAMP-START duty cycle is initiated, creating a convex portion or "rounded corner" in the current profile at $T_{OFF}$. By creating this rounded corner, rapid changes in the voltage applied to the winding and the current and fluxes induced thereby are avoided, reducing the rate of change of magnetic flux. As previously discussed, rapid changes in the flux are a primary source of acoustic noise and unwanted vibration. The hard-chopping duty cycle is thereafter adjusted to control the net average voltage applied to the phase winding such that it smoothly transitions from the positive value it had at $T_{OFF}$ to a negative value sufficient to drive the current in the phase winding down to zero.

Figure 5C:
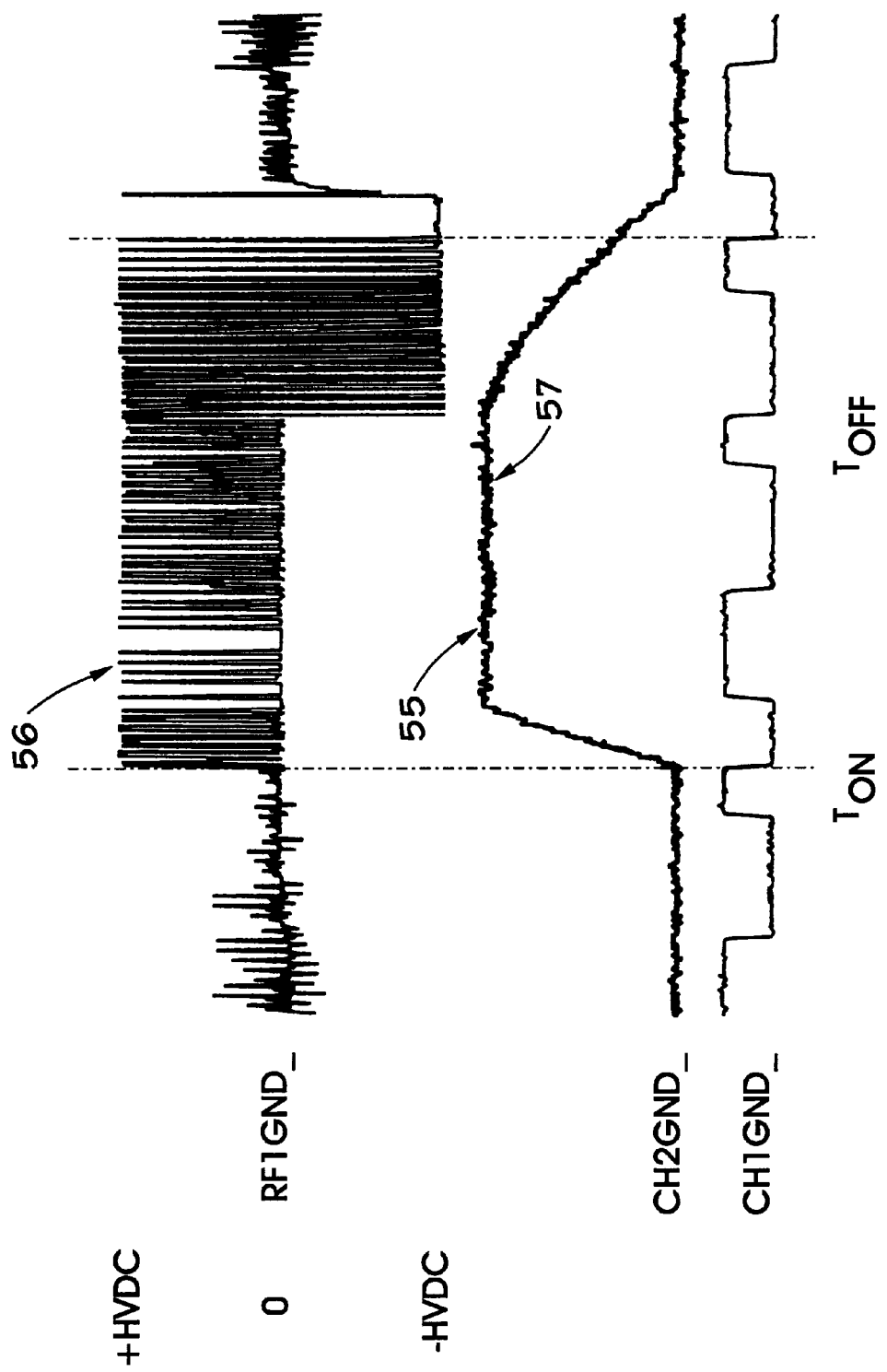
FIG. 5C illustrates voltage applied to a phase winding by the method and apparatus of the current invention and the resulting current waveform generated in the phase.
Figure 5D:
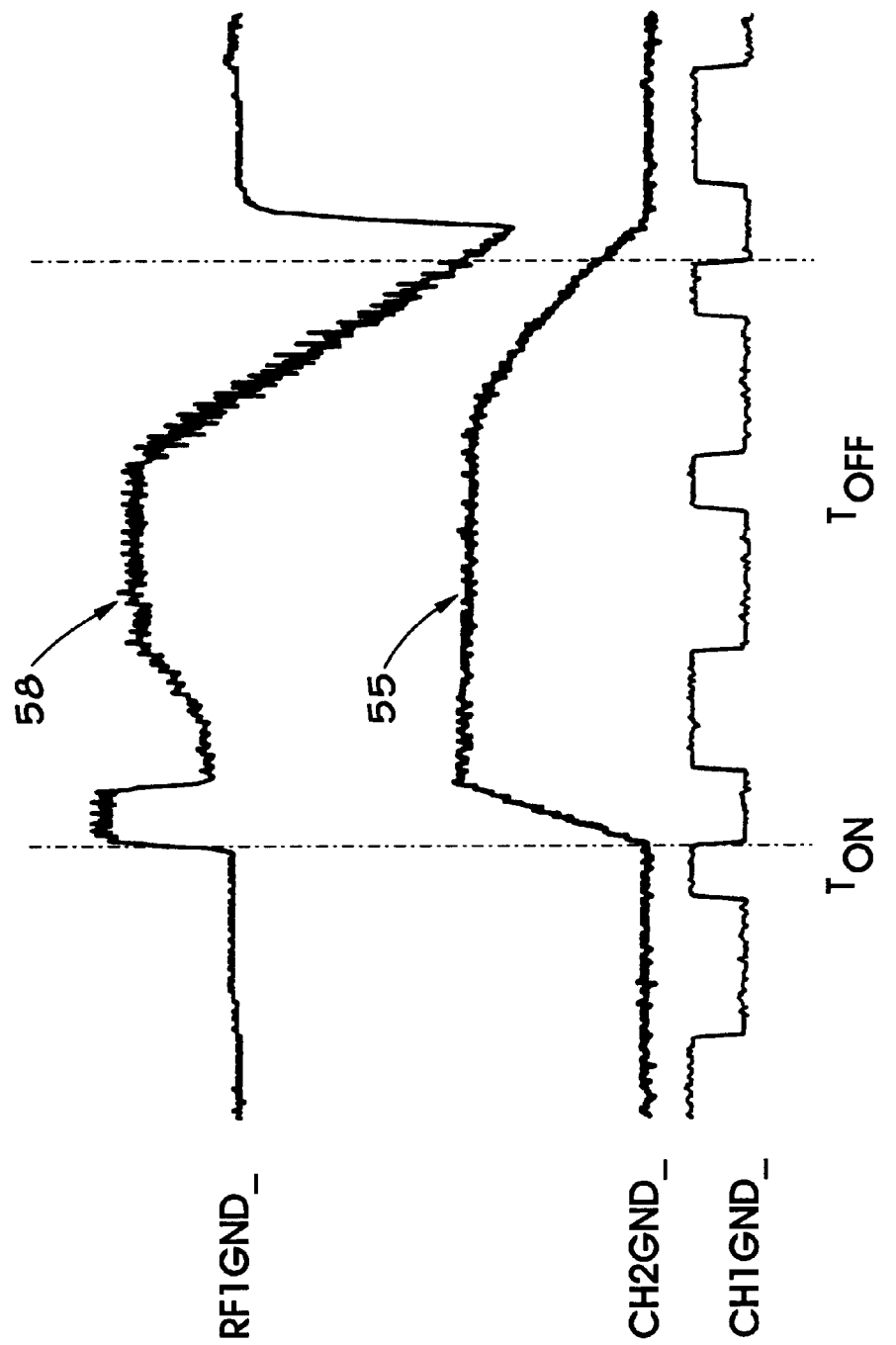
FIG. 5D illustrates the net average voltage applied to a phase winding by the method and apparatus of the current invention and the resulting current waveform generated in the phase.

FIG. 5C illustrates the phase current in a phase winding 55, and the voltage across the phase winding 56. FIG. 5D illustrates the phase current in a winding 55, and the net average voltage across the phase winding 58. In 2/3 mode shown, the controlled ramp down creates a smooth transistion or rounded corner in region 57 at $T_{OFF}$.

Figure 6A:
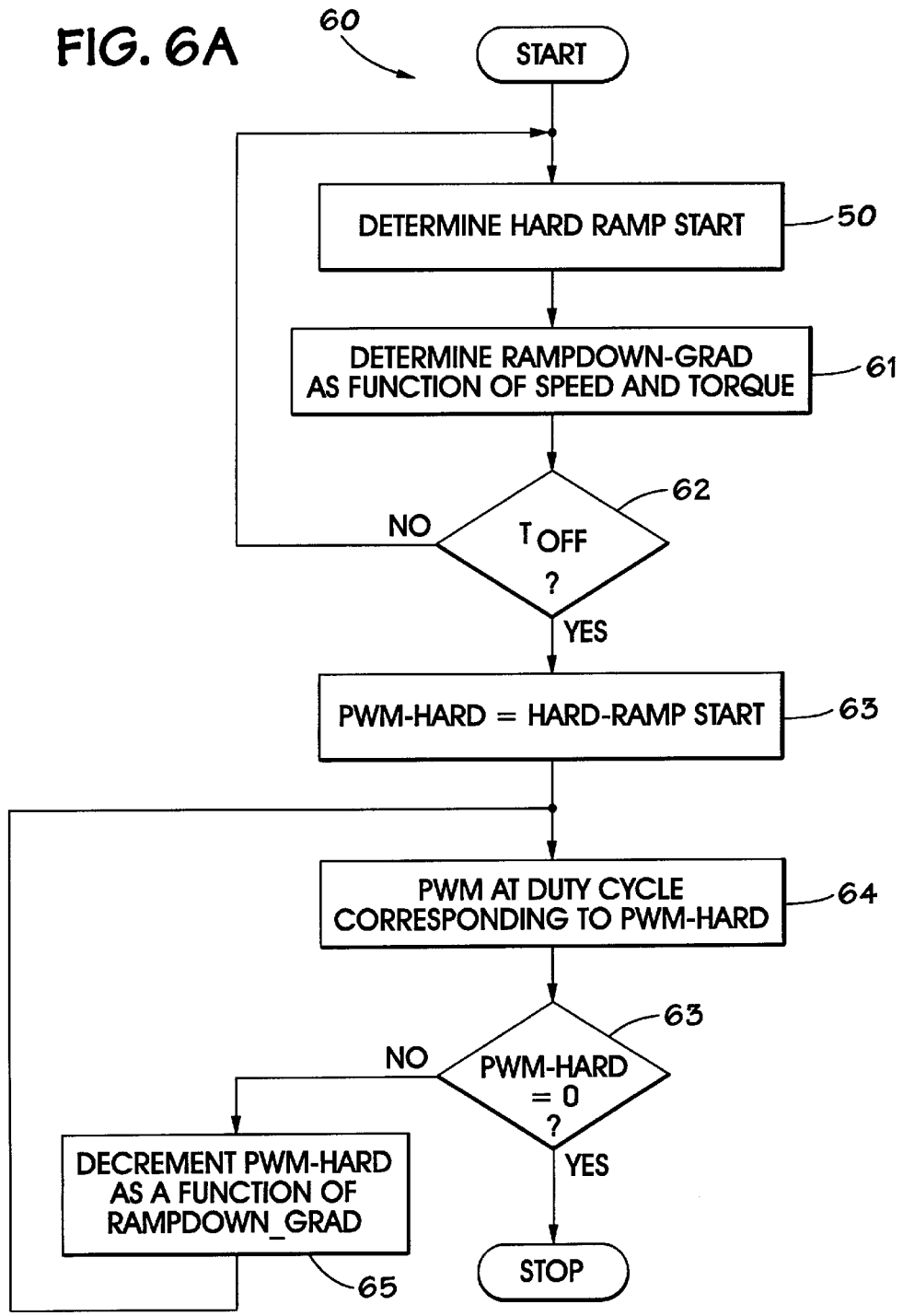
FIG. 6A illustrates in flowchart form one method in which controller 40 performs a controlled RAMP-DOWN of the phase current by gradually reducing the net average voltage applied to the phase wing.

FIG. 6A illustrates in flowchart form one method 60 in which the controlled-ramp down is accomplished by the controller 40 of the present invention. Initially at step 50 the controller determines an appropriate HARD-RAMP-START duty cycle for the actual speed and torque parameters. This may be accomplished by the method 50 discussed in connection with FIG. 5A or any of the other methods for determining HARD-RAMP-START discussed above.

After HARD-RAMP-START is selected, the controller then selects in step 61 a RAMPDOWN-GRADIENT parameter that controls the rate of change of the duty cycle that is used in the ramp-down. This RAMPDOWN-GRADIENT parameter controls the rate at which the net average voltage changes from positive to negative across the phase winding and, thus, the rate of change of the current in the phase winding and the resulting magnetic flux in the machine.

The RAMPDOWN-GRADIENT parameter may be calculated as a function of rotor speed and machine torque in a manner similar to that previously described above in connection with the calculation of the HARD-RAMP-START duty cycle. As before, the slope and offset values of the linear equation defining RAMPDOWN-GRADIENT as a function or rotor speed and torque can be experimentally determined. The other approaches discussed above in connection with the determination of the HARD-RAMP-START value can also be used to determine the RAMPDOWN-GRADIENT. FIG. 6B illustrates some experimentally derived values for the RAMPDOWN-GRADIENT for a given reluctance machine, as well as some additional linear and higher order curve fits. As may be noted the relationship between the optimum RAMPDOWN-GRADIENT and speed and torque is not linear although a linear approximation may be used for simplified control purposes. For the example of FIG. 6B, the value of RAMPDOWN-GRADIENT is inversely proportional to the rotational speed of the machine. In general, the RAMPDOWN-GRAD should be selected such that the negative slope of the current during rampdown increases as the speed of the machine increases. RAMPDOWN-GRAD may also be selected such that the negative slope of the current during ramp-down varies as torque increases to improve machine efficiency.

After the RAMPDOWN-GRADIENT is selected in step 61, the controller 40 then determines whether the rotor has reached the $T_{OFF}$ point for the appropriate phase winding. This may be accomplished by comparing a digital value representing the rotor position (that is derived from the RPT signal) with a digital value representing the $T_{OFF}$ point that is either fixed for $L_{MIN}/L_{MAX}$ and 2/3 Mode or provided to (or calculated by) the controller for Angle Control Mode. Once the controller has determined that the rotor has reached the $T_{OFF}$ position it then sets a PWM-HARD duty cycle parameter to HARD-RAMP-START and begins applying power to the appropriate phase winding at a duty-cycle corresponding to PWM-HARD parameter. The controller then enters into a loop where the controller repeatedly adjusts the PWM-HARD duty cycle to reduce the voltage applied to the phase winding as a function of the RAMPDOWN-GRAD in step 65 and returns to step 64 where it begins to apply voltage to the appropriate phase winding at the new and reduced PWM-HARD. This cycle continues until the PWM-HARD parameter corresponds to a 0% duty cycle such that the full-HVDC voltage is applied to the phase winding, or until a rotor position is reached where –HVDC is applied.

Figure 6C:
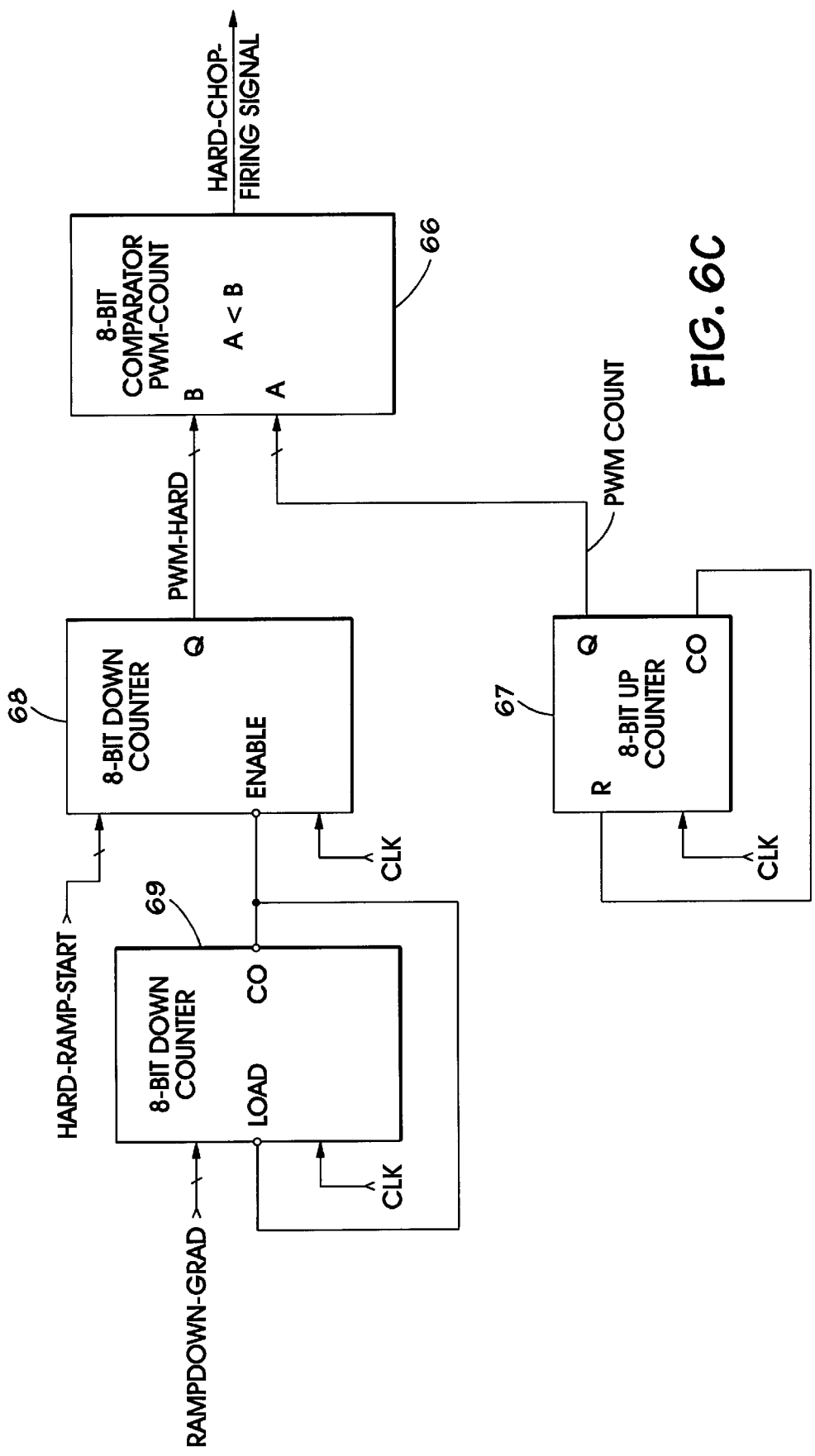
FIG. 6C illustrates exemplary circuitry for implementing the RAMP-DOWN method of the present invention.

In one embodiment of controller 40, the HARD-RAMP-START and RAMPDOWN-GRAD parameters are numbers that are used by various counters and comparators to generate the appropriate firing signals. Circuitry corresponding to this embodiment is illustrated in FIG. 6C. This circuitry may be contained within the digital core 42 of control chip 41 or may be emulated through the use of an appropriately programmed microprocessor or microcontroller.

Referring to FIG. 6C, an 8-bit comparator 66 receives at its A input the output of an 8-bit up counter 67 and at its B input the output of an 8-bit down counter 68. Comparator 66 provides an output signal (HARD-CHOP-FIRING-SIGNAL) that, in the embodiment of FIG. 6B, is positive (or logic high) whenever the 8-bit value at A is less than B and that is approximately ground (or logic low) otherwise. The HARD-CHOP-FIRING-SIGNAL may then be used by other circuitry (including driver circuitry, not shown) to actuate both power switching devices associated with the relevant phase winding into a conductive state when HARD-CHOP-FIRING-SIGNAL is high and to actuate both power devices into a non-conducting state when HARD-CHOP-FIRING-SIGNAL is low.

Up-counter 67 is configured such that the counter counts up from 0 to the maximum count value and then resets itself at a rate that corresponds to the frequency of the CLK signal. Thus, the output of up-counter 67 and the A input of comparator 66 (referred to as PWM-COUNT), cycles from 0 to a maximum value at a fixed frequency.

Down-counter 68 receives at its data input a digital value corresponding to the HARD-RAMP-START value determined by the controller. Thus, when enabled by the RAMPDOWN-GRAD as shown below, down-counter 68 will count down from HARD-RAMP-START to zero at a rate defined by the CLK signal. The enable signal to down-counter 68 is provided by the count equals zero output of another 8-bit down counter 69. Down-counter 69 is configured to repeatedly count down from its data in value (which is the RAMPDOWN-GRAD) to zero. When the counter reaches zero, it generates a C0 pulse that is applied to the enable input of down counter 68 and to the load input of down counter 69. Thus, down-counter 69 will enable down-counter 68 for a single clock pulse at a rate inversely proportional to the value of RAMPDOWN-GRAD. Thus, the lower the value of RAMPDOWN-GRAD, the more frequently the C0 pulses are generated and the faster the down-counter 68 counts down. The faster down-counter 68 counts down, the faster the duty cycle of the hard-chopping pulses drops and the faster the net average voltage applied to the phase winding changes from positive to negative. It should be noted that the circuitry of FIG. 6C would be repeated for each phase winding.

The ramp-down techniques discussed above represent examples of the types of rampdown techniques that may be used with controller 40. Specifically, the rampdown techniques described above were in connection with a hard-chopping scheme that was initiated at $T_{OFF}$. It is possible to implement a similar controlled rampdown of the phase current that began using a soft-chopping scheme at $T_{OFF}$ according to FIG. 3B(V) which results in the same net average voltage being applied at the $T_{OFF}$ point as would be provided with a hard-chopping scheme chopping at the HARD-RAMP-START duty cycle, and then ramping down the soft chopping duty cycle using techniques similar to those described above until the net average voltage applied to the appropriate phase winding is zero, or a desired value above zero. The controller could then switch to a hard-chopping scheme to drive the net average voltage negative or could switch to a soft-chopping scheme, according to FIG. 3B(VI) to accomplish the same function.

Figure 7A:
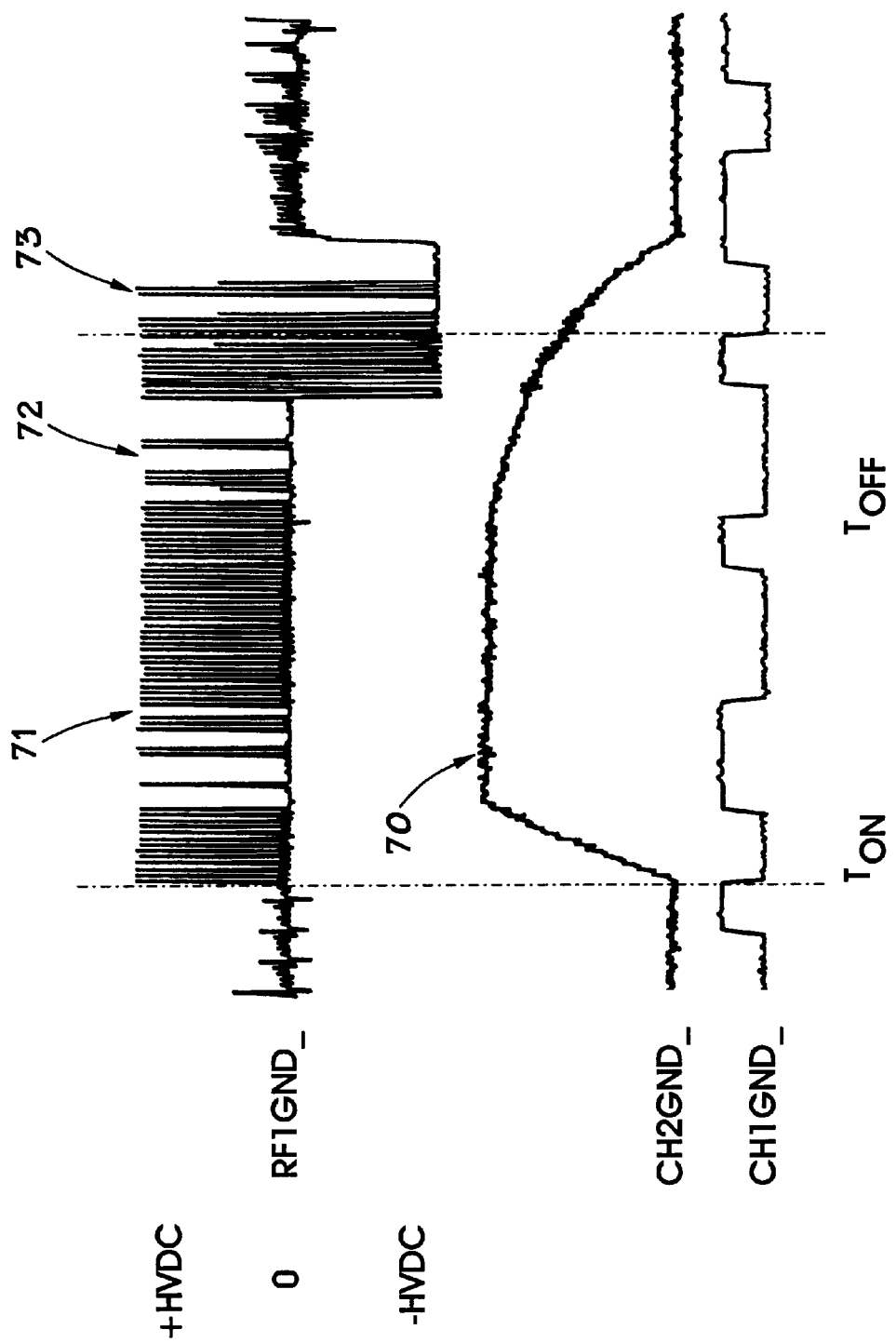
FIG. 7A illustrates an alternate embodiment of the invention wherein a +HVDC to zero voltage soft-chopping switching strategy is employed at $T_{OFF}$, the duty cycle is ramped down to zero, and then a hard-chopping switching strategy is employed.

As examples, FIG. 7A illustrates the phase current in a winding 70, and the voltage applied to the winding 71, where a soft-chopping switching strategy is applied at $T_{OFF}$ 72, the duty cycle is ramped to zero, and then a hard-chopping strategy is employed in region 73.

Figure 7B:
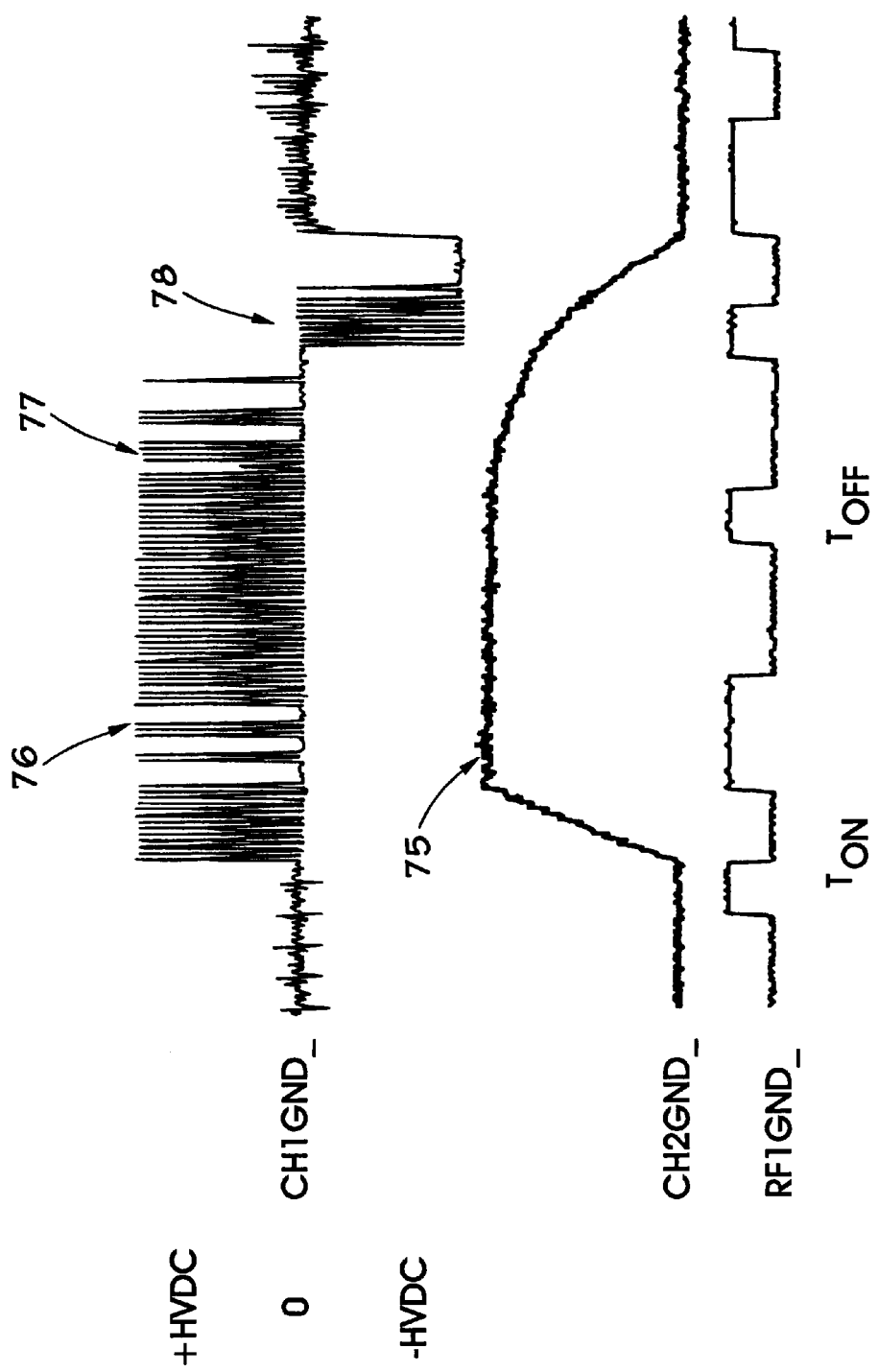
FIG. 7B illustrates another alternate embodiment of the invention wherein a +HVDC to zero voltage soft-chopping switching strategy is employed at $T_{OFF}$, the duty cycle is ramped down to zero, and then a −HVDC to zero voltage soft-chopping switching strategy is employed.

FIG. 7B illustrates the phase current in a winding 75, and the voltage applied to the winding 76, where a soft-chopping switching strategy which applies the +HVDC voltage and a zero voltage is applied at $T_{OFF}$ 77, the soft-chopping duty cycle is ramped to zero, and then a soft-chopping switching strategy which applies the −HVDC voltage and a zero voltage is employed in region 78.

Different RAMPDOWN-GRADIENT values could be used for the different soft-chop and the hard-chop sections. It should be noted that, for a given hard-chopping duty cycle, the same net average voltage will be produced by a soft-chopping duty cycle equal to twice the value of the hard-chop duty cycle minus 50% of the full period of a duty cycle. One of ordinary skill in the art having the benefit of this disclosure should be able to implement these alternate ramp down techniques. The implementation of the rampdown techniques described above result in a largely convex waveform from the $T_{OFF}$ point, or a "rounded corner," which has been found to result in reduced noise.

The ramp-down feature of controller 40 is beneficial in reducing noise and unwanted vibration for all control modes at all motor torque and speed points. At high rotational speeds, however, it may be desirable to drive the current in a given phase winding to zero as rapidly as possible following the rotor reaching the $T_{OFF}$ angle for that phase winding to avoid producing negative torque. As speed increases, RAMPDOWN-GRADIENT may be reduced to zero, effectively disabling the ramp-down functionality at high speeds and allowing the controller to render both power switching devices associated with the phase winding non-conductive at $T_{OFF}$, thus applying a full −HVDC voltage across the winding and driving the phase winding current to zero as rapidly as possible. In one embodiment of the system of the present invention, the ramp-down circuitry is disabled at rotor speeds above 1450 RPM.

In addition to providing for a controlled ramp-down of the current waveform, controller 40 also allows for a controlled ramp-up of the phase winding current and efficient fixed frequency chopping control of the phase winding during the active cycle once the peak desired current is reached. The basic method used by controller 40 for ramp-up and peak current control is illustrated in flowchart form in FIG. 8A.

Figure 8A:
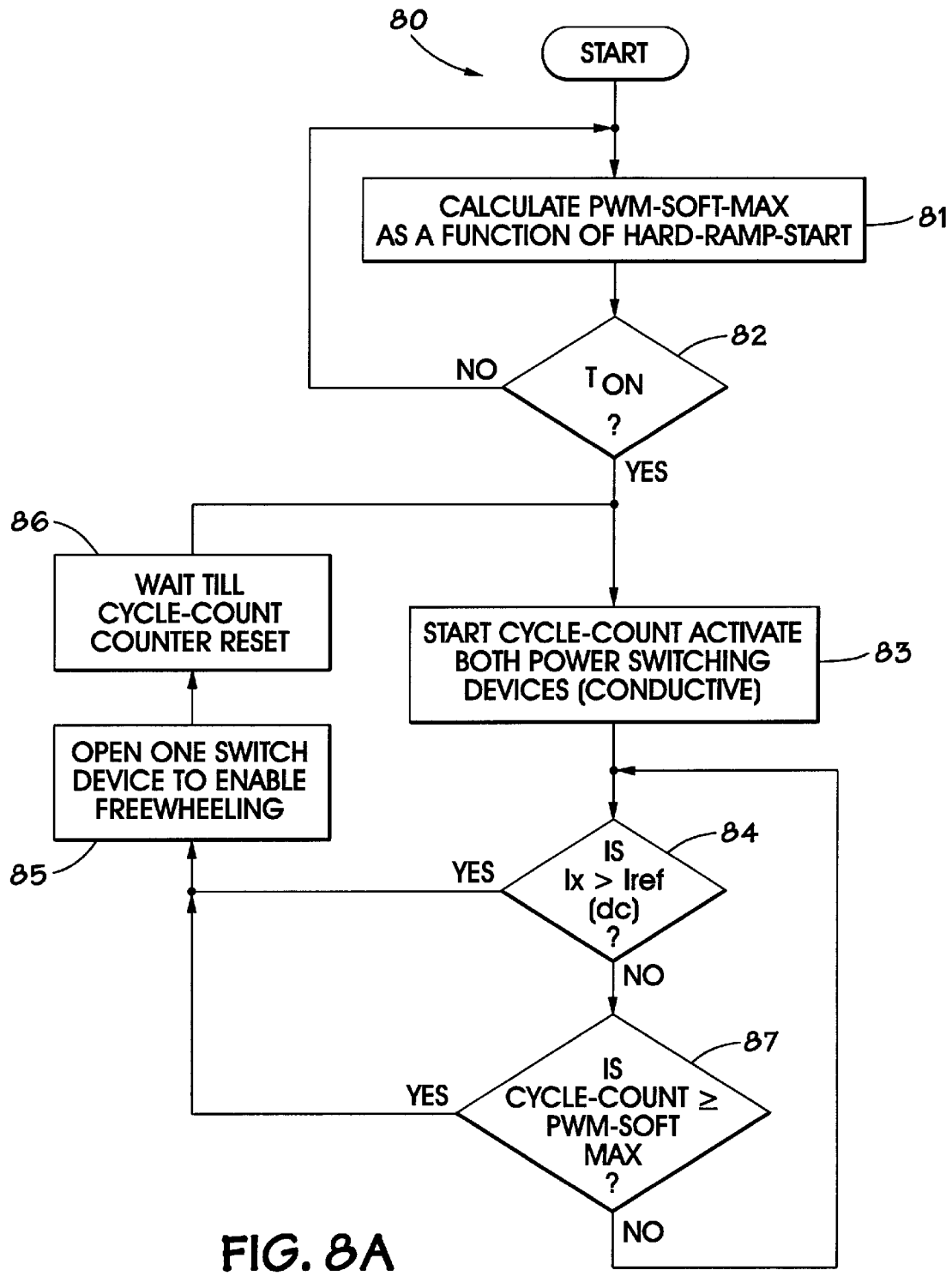
FIG. 8A illustrates in flowchart form a method in which controller 40 performs (1) a controlled RAMP-UP of the phase current and (ii) efficient fixed frequency chopping circuit in the active cycle.

Referring to FIG. 8A, prior to the initiation of an active cycle, the controller determines a maximum chopping pulse duration for the active cycle that defines the maximum width of a chopping pulse during the active cycle as a function of the signal on line 2'. In one embodiment, this parameter corresponds to a soft-chop pulse width that applies the same net average voltage, or a slightly greater net average voltage, as the duty selected for the HARD-RAMP-START duty cycle previously discussed. In such an embodiment this PWM-SOFT-MAX duty cycle parameter is calculated to be equal to twice the value of the HARD-RAMP-START duty cycle minus 50% of a fixed frequency period. This PWM-SOFT-MAX value is calculated in step 81.

The use of a PWM-SOFT-MAX that corresponds to the HARD-RAMP-START is beneficial because it reduces the relative complexity of the system in that it does not require extensive calculations to determine PWM-SOFT-MAX. However, in some applications it may be desirable to determine PWM-SOFT-MAX independently of HARD-RAMP-START using the methods previously discussed for the development of the appropriate HARD-RAMP-START values for different speed and torque combinations. While the following discussion is in the context of a PWM-SOFT-MAX value that corresponds to the HARD-RAMP-START value it should be appreciated that the PWM-SOFT-MAX value could be separately determined, and that the HARD-RAMP-START value could be determined from the PWM-SOFT-MAX value.

After determining the PWM-SOFT-MAX in step 81, the controller determines, for each phase winding, whether the TON position for that phase winding has been reached. When the position information derived from the RPT 3 indicates that $T_{ON}$ for the phase winding has been reached, the controller 40 generates firing signals to actuate both of the power switching devices associated with the phase winding into a conductive state thus applying the full +HVDC bus voltage to the relevant phase winding at the frequency and duty cycle corresponding to PWM-SOFT-MAX.

As set forth more fully below, fixed frequency chopping is implemented through the use of a counter that begins counting and reaches its maximum value at the end of the pulse cycle only to begin counting again. The output of this counter, referred to a CYCLE-COUNT is used in the controller 40 of the present invention to provide stable, fixed-frequency pulse width modulation.

Once $T_{ON}$ is reached and both power switching devices are rendered conductive, the full +HVDC power will be applied to the relevant phase winding until one of two events occurs. The controller continuously monitors the output of the current comparator 44 for each phase winding (See FIG. 4A) to determine whether the current in the relevant phase winding has exceeded the $I_{ref(DC)}$ that defines the maximum desirable peak phase winding current. If the phase current has exceeded the desired maximum value, determined in step 84, the controller will actuate one of the switching devices into a non-conductive state, step 85, and allow the current to decrease slowly as it freewheels through the conductive power device and the appropriate fly-back diode. The power switching devices will remain in this freewheeling state until the counter that defines the CYCLE-COUNT counter is reset in step 86. Upon reset of the counter, both power switching devices will again be actuated into a conductive state, step 83, and the control cycle will repeat.

If the phase current is below the maximum desired value, both power switching devices will remain conductive until the CYCLE-COUNT exceeds the PWM-SOFT-MAX count. When the CYCLE-COUNT is determined to exceed the PWM-SOFT-MAX, step 87, the power switching devices are actuated into a freewheeling arrangement, step 85, and remain in that arrangement until the CYCLE-COUNT counter is reset.

Figure 8B:
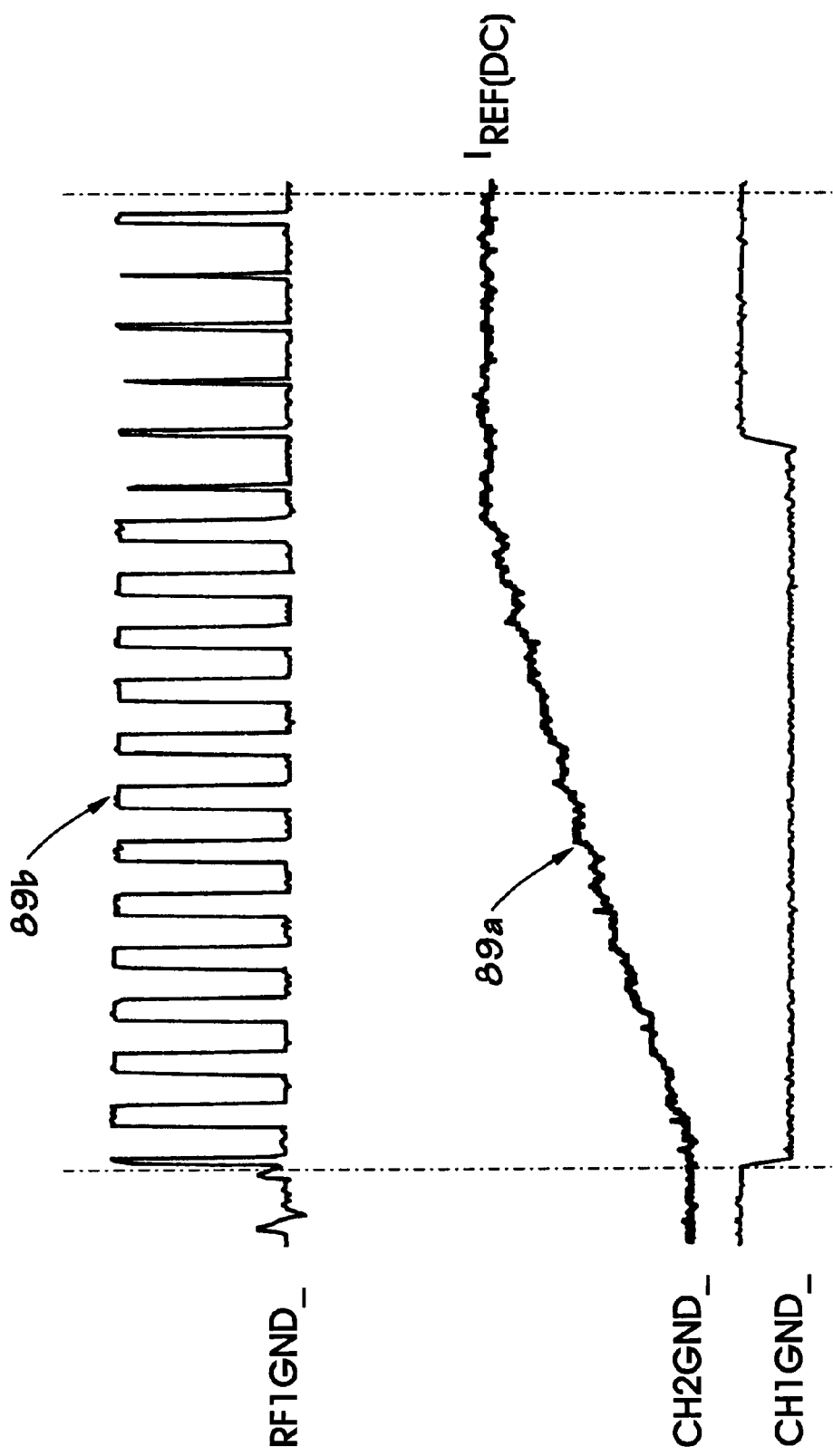
FIG. 8B illustrates current in a phase winding and the duty cycle of the applied voltage pulses during RAMP-UP.

In controller 40 of the present invention, immediately after TON, when the current in the phase winding begins to increase from zero, the PWM-SOFT-MAX count will be reached before the current in a given CYCLE-COUNT exceeds the $I_{ref(DC)}$ value. Thus, in this ramp-up region, the PWM-SOFT-MAX serves the function of limiting the rate at which the current in the phase winding increases. Eventually the current in the phase winding will reach a point where, for each CYCLE-COUNT, the phase current exceeds the $I_{ref(DC)}$ value before the PWM-SOFT-MAX count is reached. Moreover, because the inductance increases from or slightly before or after the $T_{ON}$ position is reached, the point in the CYCLE-COUNT where the phase winding current exceeds $I_{ref(DC)}$ will shift from a value nearer the start of the PWM cycle (when the phase winding inductance is low) to a point near or past PWM-SOFT-MAX as the phase winding inductance approaches its maximum value. Thus, in operation, the width of the soft-chopping pulses that are applied to the phase winding will vary from a duty cycle defined by PWM-SOFT-MAX during the ramp-up cycle of the current waveform, to a more narrow duty cycle when the phase inductance is low (because of the limiting effect of $I_{ref(DC)}$), to a duty cycle that is very nearly PWM-SOFT-MAX at the $T_{OFF}$ point. FIG. 8B illustrates current in a phase winding 88 increasing at a constant PWM-SOFT-MAX duty cycle until the current exceeds $I_{ref(DC)}$.

In addition to providing advantages in controlling the RAMP-UP of the phase current, the controller of the present invention's limiting of the maximum chopping duty cycle during the active cycle is beneficial because it allows for a fixed frequency chopping scheme that does not suffer from current programming instability. As those of ordinary skill in the art will recognize, fixed frequency converters suffer from a potential current programming instability which may result in pulses being missed or skipped, or the duty cycle changing abruptly, such that fixed frequency chopping is not maintained. This problem is well recognized and is discussed, for example, in Shu et al. "Modeling and Analysis of Switching DC to DC Converters and Constant Frequency Current Program Mode" presented at the Power of Electronics Specialist Conference in 1979. Typically complicated analog slope compensation circuitry is used to address this problem.

The controller of the present invention solves the current programming instability problem through the use of the PWM-SOFT-MAX limiter and the selected switching strategy implemented by controller 40. In particular, because the chopping pulses in the active region are limited to a specific maximum duty cycle, fixed frequency chopping will always occur. Moreover, the use of the particular scheme adopted in controller 40 insures that any variances between the desired current and the actual phase current will be minimized over time. This is accomplished at low speeds by insuring that the PWM-SOFT-MAX value is set at less than 50% of the fixed frequency duty cycle. At higher speeds and higher currents where larger duty cycles are required, instability is avoided through the use of soft chopping in the active cycle. This soft chopping solves the instability problem because the rate of change of current increase in a soft chopping scheme is greater than the rate of change for current decrease during freewheeling. This difference in the slopes of the current increase and current decreasing portions solves the instability problems.

Figure 8C:
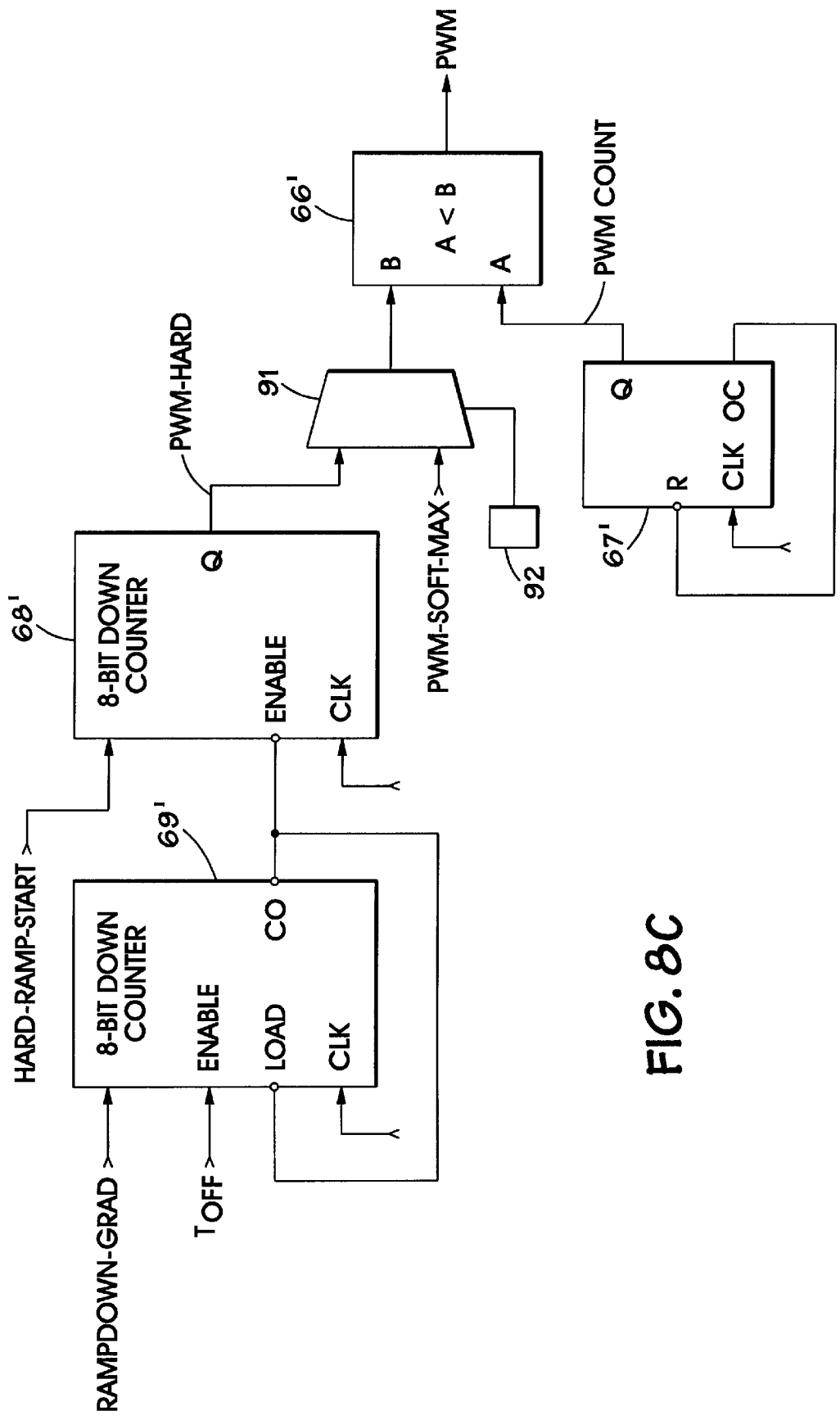
FIG. 8C illustrates exemplary circuitry for implementing the RAMP-UP and RAMP-DOWN control methods of the present invention.

FIG. 8C illustrates exemplary circuitry for implementing both the RAMP-UP and RAMP-DOWN control functions discussed above. In general, FIG. 8C is similar to the circuitry of FIG. 6C with the primary exception being the addition of a multiplexor 91 which receives as its input the output of DOWN-COUNTER 68', and a digital signal corresponding to the PWM SOFT-MAX value. A control input 82 determines which of the inputs to multiplexor 91 passes through to the B input of comparator 66'. During operation, circuitry not illustrated detects whether the phase winding corresponding to the circuitry of 8C is in the active cycle (defined by the detection of the rotor reaching the $T_{ON}$ position). When the active cycle is detected, the input 82 to multiplexor 91 is set such that the PWM SOFT-MAX value passes through multiplexor 91 to the B input of comparator 66'. Thus, from this point the comparator will produce pulses having a width that is defined by the PWM SOFT-MAX value. The output of comparator 66' may be provided to circuitry, not illustrated, which converts the output of comparator 66' to soft chopping pulses having a duty cycle defined by the lesser of: (i) the point where the phase current reaches the digital value corresponding to $I_{ref(DC)}$; or (ii) the PWM-SOFT-MAX value. Once the active cycle ends, as reflected by the detection of the $T_{OFF}$ position, the control input 82 to multiplexor 91 will change such that the digital value provided by down counter 68' is passed through multiplexor 91 to the B input of comparator 66'. An appropriate enabling signal may then be applied to DOWN-COUNTER 69' such that DOWN-COUNTER 69' is enabled only after the $T_{OFF}$ position is detected. Upon activation of DOWN-COUNTER 69', the circuitry of FIG. 8C will serve to RAMP-DOWN the phase current in a manner previously described in connection with FIG. 6C.

While the circuitry of FIG. 8C uses the HARD-RAMP-START value to define the chopping duty cycle or pulse width at the $T_{OFF}$ point, in alternate embodiments the cycle count at which the chopping pulse just prior to $T_{OFF}$ terminated is detected, and used in place of the HARD-RAMP START value when RAMP-DOWN begins. The detection of the cycle count at the time the last complete chopping pulse in the active cycle occurs may be monitored through simple circuitry and loaded as HARD-RAMP-START prior to $T_{OFF}$. The use of this circuitry, while slightly more complex, insures that there are no changes in the net average voltage applied to the phase winding before and after turn off.

While the above discussion has been generally directed to fixed frequency hard-chopping and soft-chopping techniques, those skilled in the art will recognize that other switching strategies could be employed to control the voltage applied to a phase winding. Such switching strategies could include fixed on-time or fixed off-time variable frequency techniques, voltage notching techniques, and the like. In addition, alternate embodiments are envisioned, and one skilled in the art will recognize, that current control techniques could be applied in place of the voltage control strategies employed by the current embodiment.

FIGS. 9A and 9B illustrates representative current wave forms for a motor operating with and without the RAMP-UP and RAMP-DOWN techniques described above. FIG. 9A generally illustrates a current wave form where the current rises dramatically in the region 93 from a zero value to the maximum peak value. Chopping is then initiated to control the peak phase current until the TURN-OFF point for the phase winding is reached at 94. The power switching devices associated with the phase-winding are then rendered non-conductive and the current is driven sharply down to zero. As a review of FIG. 9A indicates, there are abrupt current changes at both the front end and tail ends of the current wave-form which tend to produce unwanted noise and vibration. FIG. 9B reflects a current wave-form for which the RAMP-UP and RAMP-DOWN techniques of the present invention were applied after the $T_{ON}$ point in the region 93'. The current does not rapidly increase but instead increases in a controlled manner to the maximum peak current value. Also, after the $T_{OFF}$ point 82' the tail current does not drop off suddenly but is instead ramped down slowly such that abrupt changes in the applied voltage, the current in the phase winding, and in the magnetic flux are reduced, resulting in a reduction of unwanted noise and vibration. FIG. 9B also illustrates the current tail portions 95 corresponding to one RAMPDOWN-GRADIENT value.

The above description and several embodiments of the present invention are made by way of example and not for purposes of limitation. Many variations may be made to the embodiments disclosed herein without departing from the scope and spirit of the present invention. For example, while the above description is directed to a specific switched reluctance motor system and control device, the present invention is applicable to any form of reluctance machine regardless of the number of poles, pole shape and general layout and to machine systems that include controllers constructed through discrete digital components or analog circuits. The present invention is intended to be limited only by the scope and spirit of the following claims.

What is claimed is:

1. A method for controlling the rate of current change in a phase winding of a reluctance machine from a level of approximately zero current towards a predetermined peak current value, the phase winding being coupled by a power switching device to a source of available DC voltage, the method comprising the steps of:

establishing a fixed chopping frequency for applying voltage pulses to the phase winding where the interval between the initiation of adjacent voltage pulses defines a first time interval;

selecting a maximum active interval for applying the DC voltage to the phase winding, the maximum active interval corresponding to a percentage of the first time interval that is less than 100%, the maximum active interval defining a maximum net average voltage for application to the phase winding, applying the available DC voltage to the phase winding to initiate a voltage pulse when the rotor reaches a predetermined angular position with respect to the stator such that the current begins to increase from a level of approximately zero towards the predetermined peak current value;

monitoring the current in the phase winding and comparing a representation of the current in the phase winding with a representation of the predetermined peak current value; and removing the application of the available DC voltage from the phase winding at a time corresponding to the earlier of:
(i) a time when the phase current reaches the predetermined peak current value; or
(ii) the time when the percentage of the first time interval defined by the maximum active interval has passed since the initiation of the voltage pulse.

2. The method of claim 1 wherein the maximum interval duty cycle is selected as a function of the angular speed of the rotor.

3. The method of claim 2 wherein the maximum interval duty cycle increases with increases in the angular speed of the rotor in a non-linear manner.

4. The method of claim 1 further comprising the steps of:
receiving an indication of the desired torque output of the machine; and
selecting the maximum interval duty cycle as a function of the indication of the desired torque output of the machine.

5. The method of claim 1 wherein the step of applying the available DC voltage to the phase winding when the rotor reaches a predetermined angular position with respect to the stator is accomplished by applying a pulse width modulated voltage signal to the phase winding, where the peak voltage magnitude of the pulse width modulated signal is approximately the magnitude of the available DC voltage.

6. A method of reducing noise in a switched reluctance machine system including a reluctance machine having a rotor and a phase winding, the method comprising the act of controlling the rate of change of magnetic flux in the machine during an interval when the phase current rises from a value of approximately zero amps to a desired peak current value by:

establishing a fixed chopping frequency for applying voltage pulses to the phase winding where the interval between the initiation of adjacent voltage pulses defines a first time interval;

selecting a desired maximum time interval, where the desired maximum time interval is less than the first time interval;

applying voltage to the phase winding to initiate a voltage pulse; and removing the application of voltage from the phase winding at a time corresponding to the earlier of:
(i) a time when the phase current reaches a desired peak current value; or
(ii) the time when the maximum time interval has passed since the initiation of the voltage pulse.

7. The method of claim 6 wherein the desired maximum time interval is selected as a function of the angular speed of the rotor.

8. The method of claim 6 wherein the step of selecting a desired maximum time interval includes the steps of:
receiving a desired torque output signal representing a desired torque output for the reluctance machine; and
selecting the desired maximum time interval as a function of the desired torque output signal.

9. The method of claim 6 wherein the step of selecting a desired maximum time interval comprises the step of selecting a desired maximum time interval that is less than half of the first time interval.

10. The method of claim 6 wherein the phase winding is coupled across a DC bus by power switching devices and wherein the step of removing the application of voltage from the phase winding comprises the step of actuating the power switching devices to place the phase winding in a freewheeling condition.

11. The method of claim 6 wherein the phase winding is coupled across a DC bus by power switching devices and flyback diodes, wherein the step of applying voltage to the phase winding comprises the step of actuating the power switching devices such that positive DC bus voltage is applied to the phase winding, and wherein the step of removing the application of voltage from the phase winding comprises the step of actuating the power switching such that the negative of the DC bus voltage is applied to the phase winding via the flyback diodes.

12. The method of claim 6 wherein the step of applying voltage to the phase winding comprises the step of applying a pulse width modulated voltage signal to the phase winding.

13. A method of reducing noise in a switched reluctance machine system including a reluctance machine having a rotor and a phase winding, the method comprising the act of controlling the rate of change of magnetic flux in the machine during an interval when the phase current rises towards a maximum current value, the method comprising the steps of:

establishing a fixed chopping frequency for applying voltage pulses to the phase;

selecting a maximum time interval, the maximum time interval being less than the time interval between adjacent voltage pulses;

applying voltage to the phase winding to initiate a voltage pulse; and removing the application of voltage from the phase winding to terminate the voltage pulse at a time corresponding to the earlier of:

(i) a time when the phase current reaches the maximum current value; or (ii) the time when the maximum time interval has passed since the initiation of the voltage pulse.

14. The method of claim 13 wherein the step of selecting a desired maximum time interval includes the steps of:

receiving a desired speed signal representing a desired rotational speed for the reluctance machine; and selecting the desired maximum time interval as a function of the desired speed signal.

15. The method of claim 13 wherein the step of selecting a desired maximum time interval includes the steps of:

receiving a desired torque output signal representing a desired torque output for the reluctance machine; and selecting the desired maximum time interval as a function of the desired torque output signal.

16. The method of claim 13 wherein the step of selecting a desired maximum time interval comprises the step of selecting a desired maximum time interval that is less than half of the first time interval.

17. The method of claim 13 wherein the phase winding is coupled across a DC bus by power switching devices and wherein the step of removing the application of voltage from the phase winding comprises the step of actuating the power switching devices to place the phase winding in a freewheeling condition.

18. The method of claim 13 wherein the phase winding is coupled across a DC bus by power switching devices and flyback diodes, wherein the step of applying voltage to the phase winding comprises the step of actuating the power switching devices such that positive DC bus voltage is applied to the phase winding, and wherein the step of removing the application of voltage from the phase winding comprises the step of actuating the power switching such that the negative of the DC bus voltage is applied to the phase winding via the flyback diodes.

19. The method of claim 13 wherein the step of applying voltage to the phase winding comprises the step of applying a pulse width modulated voltage signal to the phase winding.

* * * * *

UNITED STATES PATENT AND TRADEMARK OFFICE
CERTIFICATE OF CORRECTION

PATENT NO.     : 6,051,942
DATED          : April 18, 2000
INVENTOR(S)    : Alan P. French It is certified that error appears in the above-identified patent and that said Letters Patent is hereby corrected as shown below:

<u>Title page,</u>
Item [56], References Cited, U.S. PATENT DOCUMENTS, insert -- 4,500,824, 02/19/85, Miller, 318/701 --
OTHER PUBLICATIONS, insert -- Charles Pollock and Barry W. Williams, "A Unipolar Converter for a Switched Reluctance Motor," *Conference Record of the 1988 IEEE Industry Applications*, Society Annual Meeting, pp. 44-49, Pittsburg, Pennsylvania, October 2-7, 1988 -- and insert -- C. Y. Wu and C. Pollock, "Analysis and Reduction of Vibration and Acoustic Noise in the Switched Reluctance Drive," *IEEE Transactions on Industry Applications*, Vol. 31, No. 1, pp. 91-98, January/February 1995 --

Signed and Sealed this

Sixth Day of August, 2002

*Attest:*

*Attesting Officer*

JAMES E. ROGAN
*Director of the United States Patent and Trademark Office*